(12) United States Patent
Yanagida et al.

(10) Patent No.: US 7,859,590 B2
(45) Date of Patent: Dec. 28, 2010

(54) ELECTRONIC DEVICE HAVING DEVICE SIDE TERMINAL PORTION FOR CONTACT WITH BATTERY

(75) Inventors: Kenji Yanagida, Aichi (JP); Sachio Tomomori, Kanagawa (JP); Tomonori Watanabe, Tokyo (JP); Tetsuya Okuchi, Tokyo (JP)

(73) Assignee: Sony Corporation (JP)

( * ) Notice: Subject to any disclaimer, the term of this patent is extended or adjusted under 35 U.S.C. 154(b) by 1037 days.

(21) Appl. No.: 11/374,493

(22) Filed: Mar. 13, 2006

(65) Prior Publication Data

US 2006/0250110 A1    Nov. 9, 2006

(30) Foreign Application Priority Data

Mar. 14, 2005    (JP) .............................. 2005-071603

(51) Int. Cl.
*H04N 5/225*    (2006.01)
*H01N 2/10*    (2006.01)

(52) U.S. Cl. ...................... 348/372; 348/373; 429/187; 361/235

(58) Field of Classification Search ................. 348/372, 348/373
See application file for complete search history.

(56) References Cited

U.S. PATENT DOCUMENTS 5,470,255 A * 11/1995 McCleerey et al. .......... 439/500
5,865,643 A * 2/1999 Suzuki ........................ 439/500
6,302,727 B1 * 10/2001 Fedorjaka .................... 439/500
6,515,450 B1 * 2/2003 Kaiho et al. ................. 320/112
6,652,302 B1 * 11/2003 Yeh ............................. 439/188
2003/0155889 A1 * 8/2003 Howard et al. .............. 320/113
2005/0158621 A1 * 7/2005 Benoit et al. ................ 429/178

FOREIGN PATENT DOCUMENTS

JP    2002-110121 A    4/2002
JP    2003-036915 A    2/2003

* cited by examiner

*Primary Examiner*—Tuan Ho
*Assistant Examiner*—Hung H Lam
(74) *Attorney, Agent, or Firm*—Lerner, David, Littenberg, Krumholz & Mentlik, LLP

(57) ABSTRACT

An electronic device includes, in an interior of a flat housing, a battery compartment, and a device side terminal portion that contacts a side terminal portion of a battery stored in the battery compartment portion. The device side terminal portion includes a plurality of terminals that contact terminals of the side terminal portion of the battery, and a terminal holder that holds the plurality of terminals and that is attached to a printed circuit board. The terminal holder includes a printed circuit board overlap portion that supports the printed circuit board in overlapping relationship with a side portion of the terminal holder. The plurality of terminals are connected to the printed circuit board through the printed circuit board overlap portion. The device side terminal portion also includes one or more ground terminals.

22 Claims, 39 Drawing Sheets

RELATED ART

ELECTRONIC DEVICE HAVING DEVICE SIDE TERMINAL PORTION FOR CONTACT WITH BATTERY

CROSS-REFERENCE TO RELATED APPLICATIONS

The present application claims priority from Japanese Patent Application No. 2005-071603 filed on Mar. 14, 2005, the disclosure of which is hereby incorporated by reference herein.

BACKGROUND OF THE INVENTION

The present invention relates to battery-using electronic devices, such as digital camera and portable game machine.

As electronic devices such as digital cameras and portable game machines, those of the type using a battery are known (such as a device disclosed in Japanese Unexamined Patent Application Publication No. 2003-36915, for example). In addition, a battery of the type as a battery 301 shown in FIG. 49 is known that is formed in a flat, thin rectangular parallelepiped shape with a battery side terminal portions 302 being provided on a front end portion. The battery side terminal portions 302 include, for example, a positive terminal 303 (first terminal), a control terminal 304 (second terminal), a negative terminal 305 (third terminal) (such as a device disclosed in Japanese Unexamined Patent Application Publication No. 2002-110121, for example).

An electronic device using the battery 301, of course, has a battery compartment portion. A rear end portion of the battery compartment portion has a device side terminal portion for being contacted with the first to third battery side terminals 303 to 305 of the battery side terminal portions 302. Upon insertion of the battery into the battery compartment portion, the battery side terminals 303 to 305 of the battery side terminal portion are brought into contact with first to third terminals of the device side terminal portion provided on the side of the rear end of the battery compartment portion.

With an electronic device using a flat, thin battery, which is configured as shown in FIG. 50 for example, there are problems as described herebelow. A device side terminal portion 313 is configured with a plurality of terminals 311 mounted to a terminal holder 312. The terminal holder 312 is disposed on a printed circuit board 314, and lower end portions 311a of the terminals 311 formed to protrude from the lower end of the terminal holder 312 are led out from openings 315 provided to the printed circuit board 314 to the side of a lower end face of the printed circuit board 314. Thereafter, the lower end portion 311a are connected with the printed circuit board 314 through soldered portions 316. Problems occurring in this case are as described herebelow.

(1) A height H1 from the upper end of the terminal holder 312 either to the lower end portions 311a of the terminals 311 or to the lowers end of the soldered portions 316 is a sum value of a height H2 of the terminal holder 312 plus a thickness H3 of the printed circuit board 314 plus a length of the lower end portion 311a of the terminals 311 protruding from the lower end face of the printed circuit board 314 or a thickness H4 of the soldered portions 316 (H1=H2+H3+H4). This hinders reduction of the thickness of the electronic device.

(2) Grounding of the device side terminal portion 313 is not taken into account. A grounding structure has to newly be provided for grounding of the device side terminal portion 313, thereby increasing the cost.

SUMMARY OF THE INVENTION

The present invention is intended to enable the thickness of the device to be reduced by reducing the height H from the upper end of the terminal holder either to the lower end portions of the plurality of terminals or to the lower ends of the soldered portions.

Further, the present invention is intended to facilitate grounding of the device side terminal portions.

According to an embodiment of the present invention, an electronic device includes a flat housing having an interior; a battery compartment in the interior of the housing; and a device side terminal portion in the interior of the housing that contacts a side terminal portion of a battery stored in the battery compartment. The device side terminal portion includes a plurality of terminals that contact terminals of the side terminal portion of the battery, and a terminal holder that holds the plurality of terminals and that is attached to a printed circuit board. The terminal holder includes a printed circuit board overlap portion that supports the printed circuit board in overlapping relationship with a side portion of the terminal holder. The plurality of terminals of the device side terminal portion are connected to the printed circuit board through the printed circuit board overlap portion. One end of the terminals of the device side terminal portion has contacts that protrude from one side surface of the terminal holder and that contact the terminals of the battery stored in the battery compartment. The other end of the terminals has printed circuit board connection portions that protrude through the printed circuit board overlap portion to a side of the printed circuit board overlapping with the printed circuit board overlap portion. The printed circuit board connection portions are soldered to the printed circuit board.

The terminal holder is formed into substantially an "L" shape including a holder body portion and the printed circuit board overlap portion protruding from one side surface of the holder body portion, the holder body portion including openings that contain contacts of the terminals. Front ends of the respective contacts protrude from the one side surface of the holder body portion through the openings.

The terminals, respectively, include base portions, the contacts being provided on one end of the base portions, and printed circuit board connection portions being provided on the other end of the base portions to be substantially parallel to the contacts. The base portions are placed on the holder body portion of the terminal holder, and the contacts are set into the contact containing openings, whereby the base portions on the holder body portion of the terminal holder are attached to the terminal holder in a state where front ends of the respective contacts protrude from the openings of the holder body portion on the side of the one side surface of the holder body portion. The printed circuit board connection portions protrude onto the printed circuit board overlapping with the printed circuit board overlap portion, and the protruded portions are soldered to the printed circuit board. The terminal may be integrally formed by bending a single metal plate.

One or more ground terminals connecting to at least one of the plurality of terminals are provided to the terminal holder. The ground terminals are disposed on an upper surface and a lower surface of the terminal holder, or on either the upper surface or the lower surface. The ground terminals are connected to a negative terminal of the plurality of terminals. The ground terminals may be integrated with the negative terminal.

As described above, since the printed circuit board is disposed in the side portion of the terminal holder, the thickness of the printed circuit board can be included in the height of the terminal holder, thereby enabling the thickness to be reduced. The printed circuit board connection portions provided on one end of the terminals of the device side terminal portion protrude onto the printed circuit board, and are thereby soldered to the printed circuit board. As such, the length of the respective printed circuit board connection portion and the thickness of the respective soldered portion can be included in the height of the holder body portion, thereby enabling the thickness to be reduced.

The terminal holder is formed into substantially an "L" shape to include the holder body portion and the printed circuit board overlap portion protruding from the one side surface of the holder body portion, in which the holder body portion includes openings that contain contacts of the terminals. In addition, the front end portions of the contacts of the terminals, respectively, protrude outwardly of the one side surface of the holder body portion through the openings. Accordingly, it is possible to prevent the occurrence of a case in which, when the contacts are compressed by the terminals of the battery, the contacts are pushed back into the contact containing openings to thereby cause exertion of excessively high pressure on the contacts, and to minimize the space for storing the contacts.

The terminals, respectively, include base portions, the contacts being provided on one end of the base portions, and the printed circuit board connection portions being provided on the other end of the base portions. Accordingly, the base portions are placed on the holder body portion of the terminal holder, and the contacts are set into the contact containing openings, whereby the base portions on the holder body portion of the terminal holder can be attached to the terminal holder in the state where front ends of the respective contacts protrude from the contact containing openings of the holder body portion to the side of the one side surface of the holder body portion. In particular, the portions protruding onto the printed circuit board through the connection portion lead-out openings provided on the printed circuit board overlapping with the printed circuit board overlap portion can easily be soldered to the printed circuit board. The terminal is integrally formed by bending a single metal plate, such that the terminal can easily be manufactured, and appropriate elasticity can be imparted with the metal plate to the respective contact.

One or more ground terminals are provided to the terminal holder, and the ground terminals are connected to at least one of the plurality of terminals. Accordingly, grounding can easily be accomplished in the manner that the ground terminals are brought into contact with, for example, a metal frame of the electronic device. In particular, since the ground terminals are disposed on an upper surface and a lower surface of the terminal holder, grounding can be accomplished in the manner that any one of the ground terminals is brought into contact with, for example, a metal housing cover. In addition, the ground terminal(s) and the negative terminal may be integrally formed, such that the costs can be reduced and assembly into the terminal holder can be facilitated in comparison to the case that the ground terminals and the negative terminal are independently manufactured.

DETAILED DESCRIPTION

An electronic device of the present invention will be described below in the following order: (1) Overall Configuration of Electronic Device; (2) Configuration of Camera Body Section; (3) Configurations of Battery and Device Side Terminal Portion for being Contacted with Battery; (4) Configuration of Barrier; (5) Configurations of Rollers; (6) Configurations of Barrier Slide Guide Slide Portions; (7) Configuration of Toggle Spring; (8) Configuration of Cover of Memory Card Containing Section; (9) Configuration of Cover of Battery compartment portion; (10) Configuration of Battery Release Lever; and (11) Configuration of Strap Fixture.

(1) Overall Configuration of Electronic Device

Figure 1A:
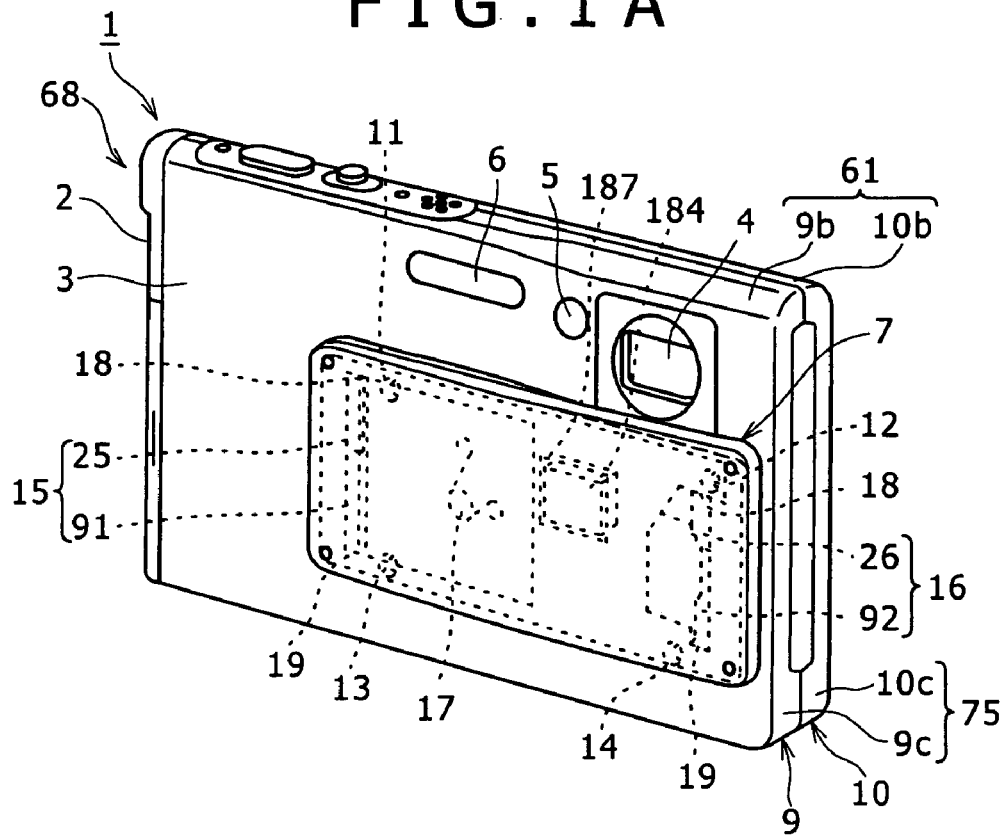
FIG. 1A is a perspective view of a digital camera in a state where a barrier is moved to a first position (or, "release position")
Figure 1B:
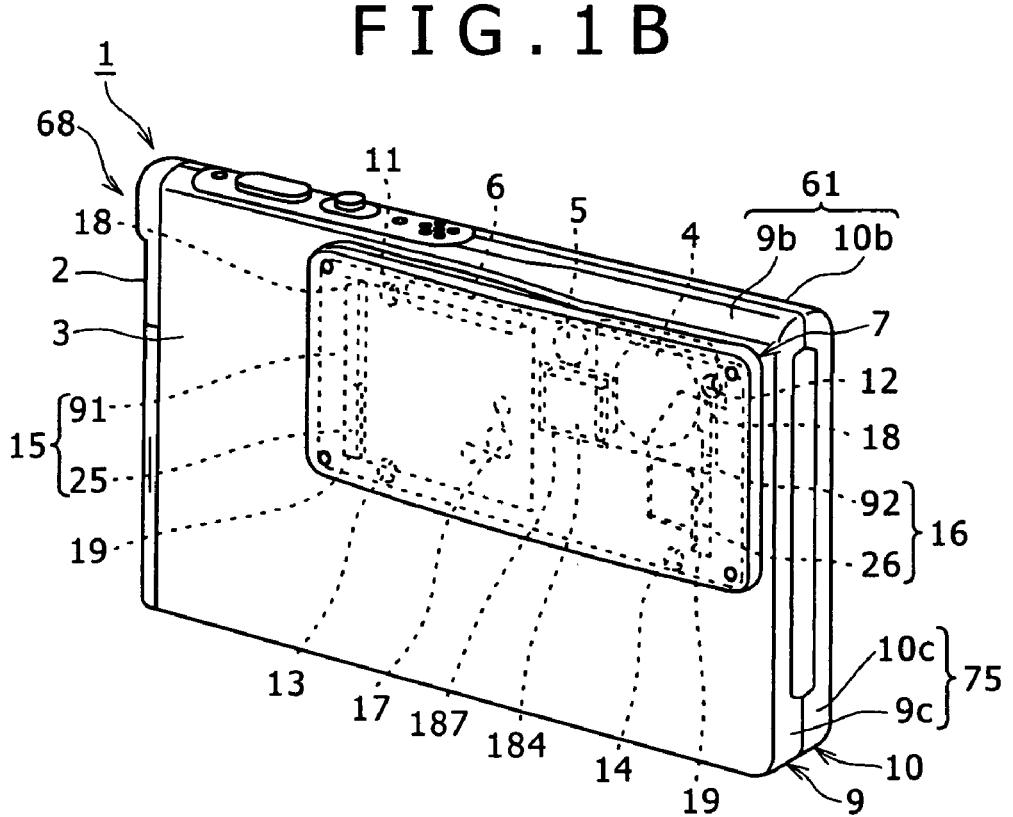
FIG. 1B is a perspective view of the camera in a state that the barrier is moved to a second position (or, "inhibited position")
Figure 2A:
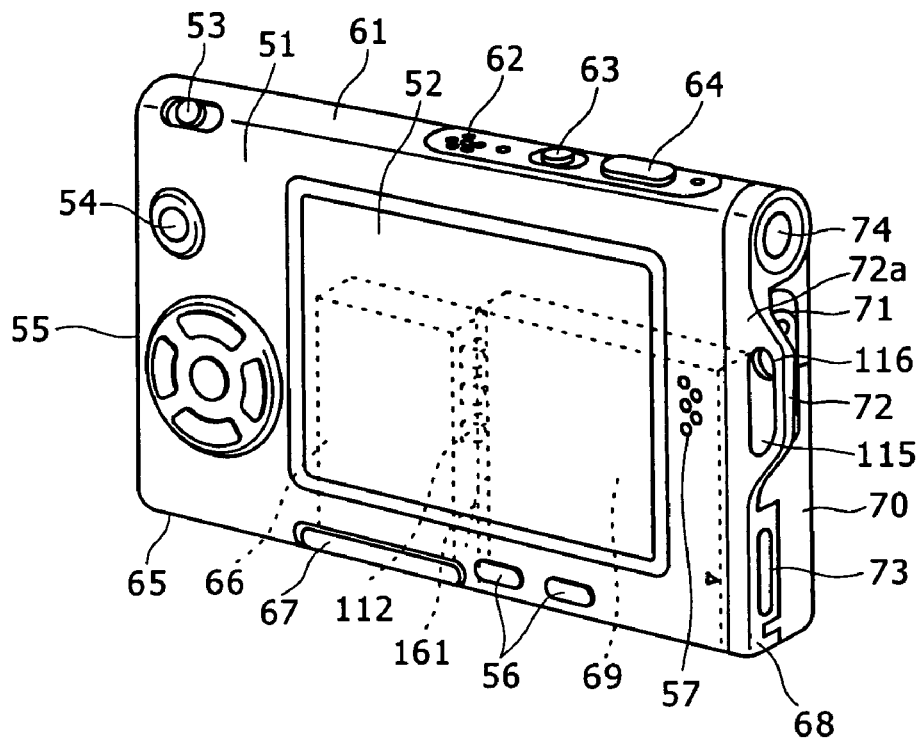
FIG. 2A is a rear perspective view of the camera.
Figure 2B:
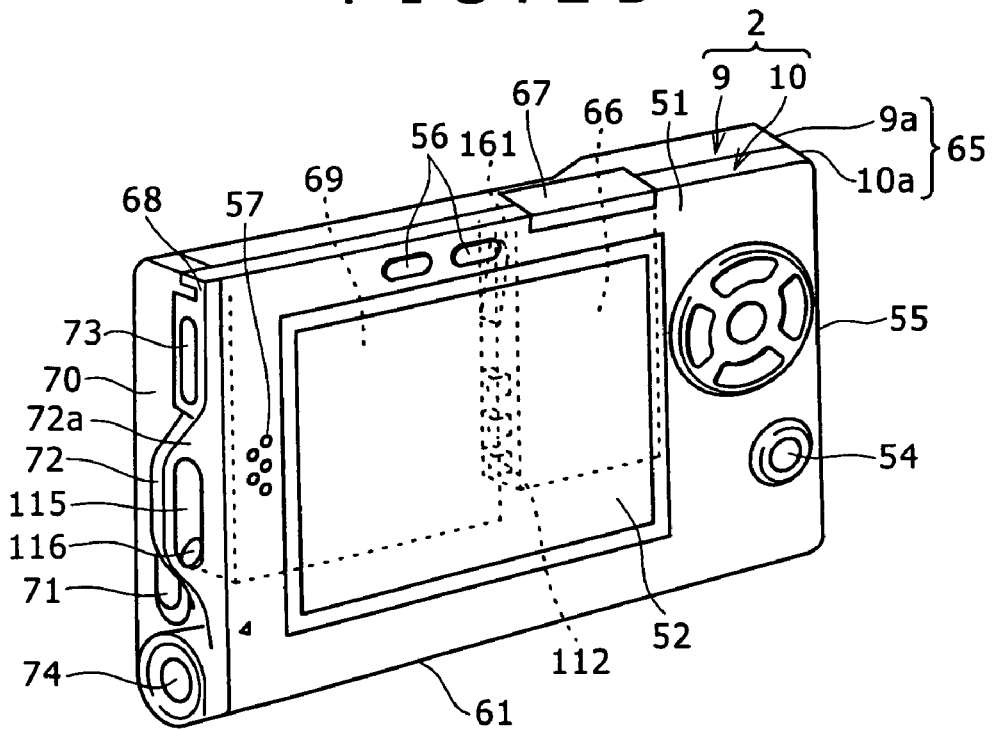
FIG. 2B is a bottom perspective view of the camera.

FIGS. 1A and 1B are each a perspective view of a digital camera 1 as viewed from the side of a first major face 3 (front face) thereof; and FIGS. 2A and 2B are each a perspective view of the digital camera 1 as viewed from a second major face 51 (reverse face) thereof.

The digital camera 1 has a barrier 7 (lens cover) that is movable between first and second positions on the first major face 3 of a flat, rectangular parallelepiped camera body 2. In the first position, the exposure of an imaging lens 4, an AF (autofocus) illuminator 5 for emission of autofocus auxiliary light, and flashlight emission section 6 are disposed, and the barrier 7 causes the imaging lens 4, AF illuminator 5, and flashlight emission section 6 shown in FIG. 1A to be exposed.

In the second position, the imaging lens 4, AF illuminator 5, and flashlight emission section 6 shown in FIG. 1B are covered by the barrier 7. A portion of an iris drive mechanism 184 stored in the camera body 2 is extended from the first major face 3 of the camera body 2.

As shown in FIG. 1A, the portion of the iris drive mechanism 184 is extended in a position that is covered by the barrier 7 either when the barrier 7 stays in the first position or, as shown in FIG. 1B, when the barrier 7 stays in the second position.

The barrier 7 is formed substantially rectangular. First to fourth rollers 11 to 14 in contact with the first major face 3 of the camera body 2 are provided in four corner portions of the barrier 7, and a pair of first and second barrier slide guide portions 15 and 16 are disposed in two side sections along the movement direction. The barrier 7 is moved between the first and second positions on the first major face 3 of the camera body 2 in accordance with operations of the first to fourth rollers 11 to 14 and the first and second barrier slide guide portions 15 and 16.

As described in detail further below in the section of the configuration of the camera body 2, the first barrier slide guide portion 15 includes a first barrier engagement body 25 provided on the side of camera body 2, and a rail-shaped first barrier engagement body engagement portion 91 with which the first barrier engagement body 25 provided on the barrier side slidably mates. Similarly as the first barrier slide guide portion 15, the second barrier slide guide portion 16 includes a second barrier engagement body 26 provided on the side of camera body 2, and a rail-shaped second barrier engagement body engagement portion 92 with which the second barrier engagement body 26 provided on the barrier side slidably mates.

As shown in FIG. 1A, when the barrier 7 stays in the first position, first stopper portions 18 provided on one-end sides of the rail-shaped first and second barrier engagement body engagement portions 91 and 92 are urged by spring forces of a barrier urging spring 17 ("toggle spring," hereafter) onto the first and second barrier engagement bodies 25 and 26. Thereby, the imaging lens 4, the AF illuminator 5, and the flashlight emission section 6 are maintained exposed. On the other hand, as shown in FIG. 1B, when the barrier 7 stays in the second position, second stopper portions 19 provided on the other-end sides of the rail-shaped first and second barrier engagement body engagement portions 91 and 92 are urged by spring forces of the toggle spring 17 onto the first and second barrier engagement bodies 25 and 26. Thereby, the imaging lens 4, the AF illuminator 5, the flashlight emission section 6, and the iris drive mechanism 184 are maintained partially covered.

As shown in FIGS. 2A and 2B, a memory card containing section 66 for storing a recording medium, such as a memory card, is provided in the camera body 2. The memory card containing section 66 for containing a memory card is formed with an open portion on a first end face 65 (lower end face) connecting between the first and second major faces 3 and 51. The memory card is inserted into and removed from the opening portion. The opening portion of the memory card containing section 66 is opened and closed with a cover 67 for the memory card containing section 66 ("memory card cover," hereafter). In the camera body 2, a battery compartment portion 69 is provided in the direction perpendicular to the memory card containing section 66. The battery compartment portion 69 is formed with an opening portion on a second end face 68 (right-hand end face) connecting between the first and second major faces 3 and 51. A battery is inserted into and removed from the battery compartment portion 69 through the opening portion. The opening portion of the battery compartment portion 69 is opened and closed with a battery cover 70. A battery release lever 71, a metallic strap fixture 72, a multiconnector connection terminal 73, and a power button 74 are provided in a side portion of the battery cover 70. The battery release lever 71 permits the battery to be inserted into and removed from the battery compartment portion 69. The metallic strap fixture 72 overlaps the battery cover 70 when the battery cover 70 is opened. The battery release lever 71 is disposed in a side portion of the battery cover 70 in the state not overlapping with the battery cover 70. A device side terminal portion 112 for contacting with terminals of the battery and a battery ejecting spring 161 are provided on a rear end face of the battery compartment portion 69.

When the battery is inserted into the battery compartment portion 69, the battery ejecting spring 161 is compressed by a front end surface of the battery, whereby the battery ejecting spring 161 is urged. When the battery is stored in the battery compartment portion 69, the terminals provided on the front end surface of the battery contacts the device side terminal portion 112 provided on the depth-wise end side of the battery compartment portion 69. Then, the front end of the battery release lever 71 press-holds a back surface of the battery, thereby to prevent the battery to fall out of the battery compartment portion 69.

When removing the battery from the battery compartment portion 69, press holding of the back surface of the battery by battery release lever 71 is cancelled. Then, the battery is pushed a predetermined amount by spring forces of the battery ejecting spring 161 from the battery compartment portion 69.

(2) Configuration of Camera Body Section

Figure 3:
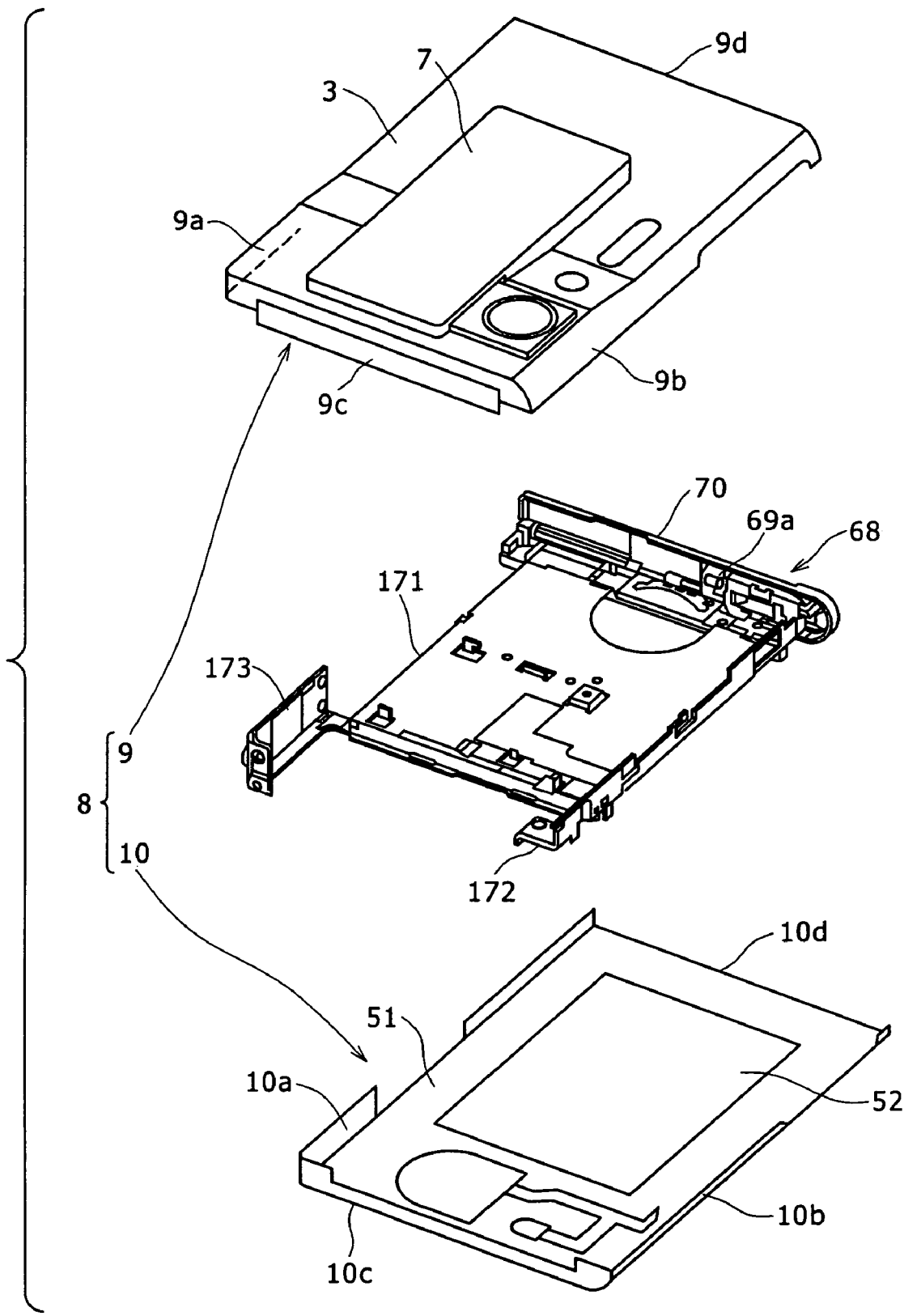
FIG. 3 is an exploded perspective view of a housing.
Figure 4:
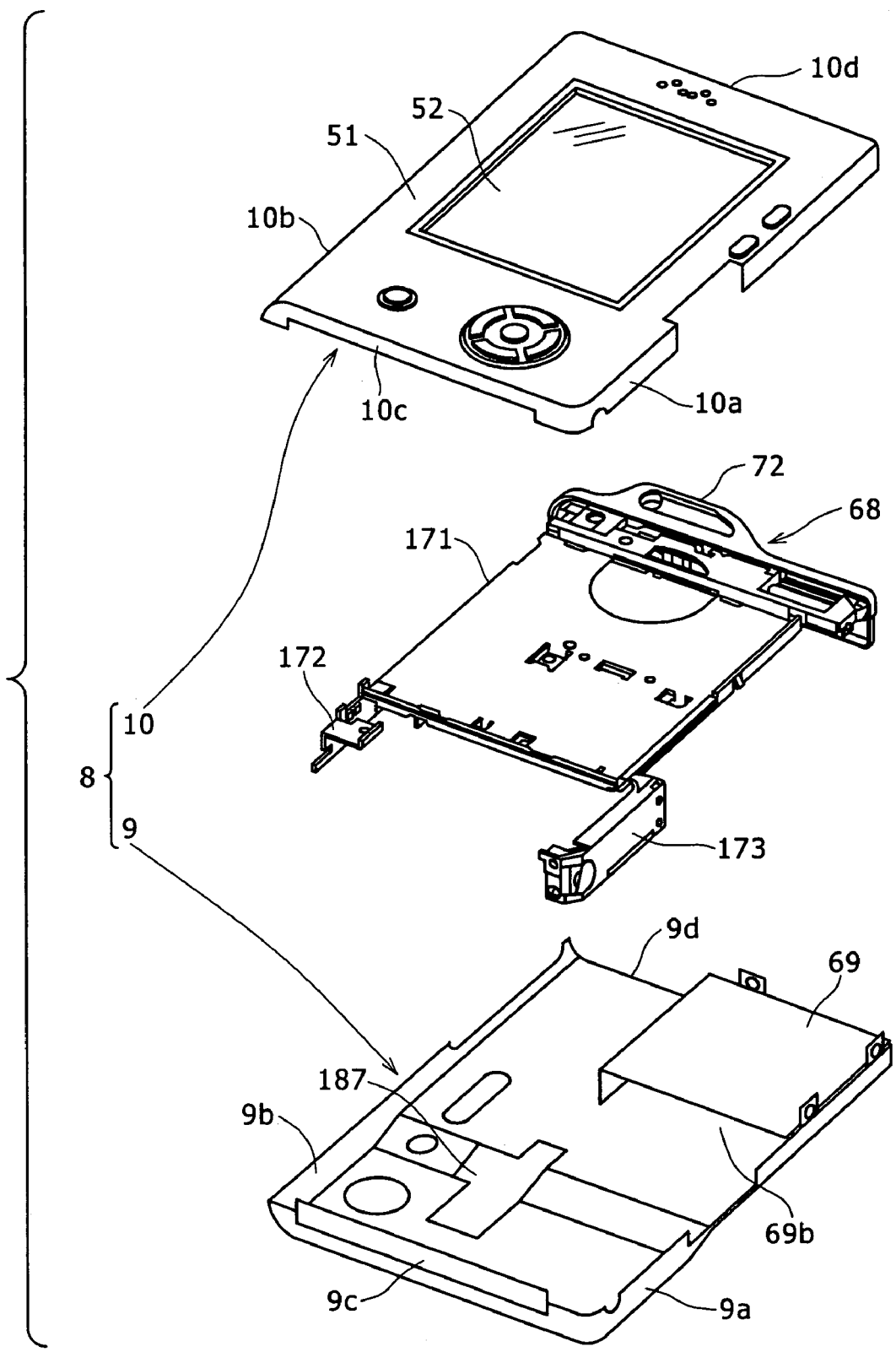
FIG. 4 is an exploded perspective view of the housing.

The camera body 2 is configured through assembly of respective components into a housing 8. With reference to FIGS. 3 and 4, the housing 8 is formed by coupling an upper cover plate 9 having the first major face 3 and a lower cover plate 10 having the second major face 51 together. A first end face 65 (lower end face in normal use of the camera) of the housing 8 is configured by butt jointing a first edge 9a of the upper cover plate 9 and a first edge 10a of the lower cover plate 10 (see FIG. 2B) together.

A third end face 61 of the housing 8 is configured by butt jointing a second edge 9b of the upper cover plate 9 and a second edge 10b of the lower cover plate 10 together (see FIG. 1A). A fourth end face 75 (left-hand end face in normal use of the camera) of the housing 8 is configured by butt jointing a third edge 9c of the upper cover plate 9 and a third edge 10c of the lower cover plate 10 (see FIG. 1A).

A one-end side 9d of the upper cover plate 9 and a one-end side 10d of the lower cover plate 10 that oppose the fourth end face 75 are disposed to form an opening. The second end face 68 (end face on the right hand side of the user in normal use of the camera) of the housing 8 is assembled to the aforementioned opening.

The second end face 68 of the camera body 2 is formed by aluminum die casting or plastic injection molding, and an opening portion 69a (see FIG. 3) of the battery compartment portion 69 is formed. The opening portion 69a is opened and closed with the battery cover 70 described below. As shown in FIG. 4, the metallic strap fixture 72 is integrally formed on an external side of the second end face 68. A partition plate 171 for partitioning the inside of the housing 8 is disposed on an inner surface side of the second end face 68.

Figure 5:
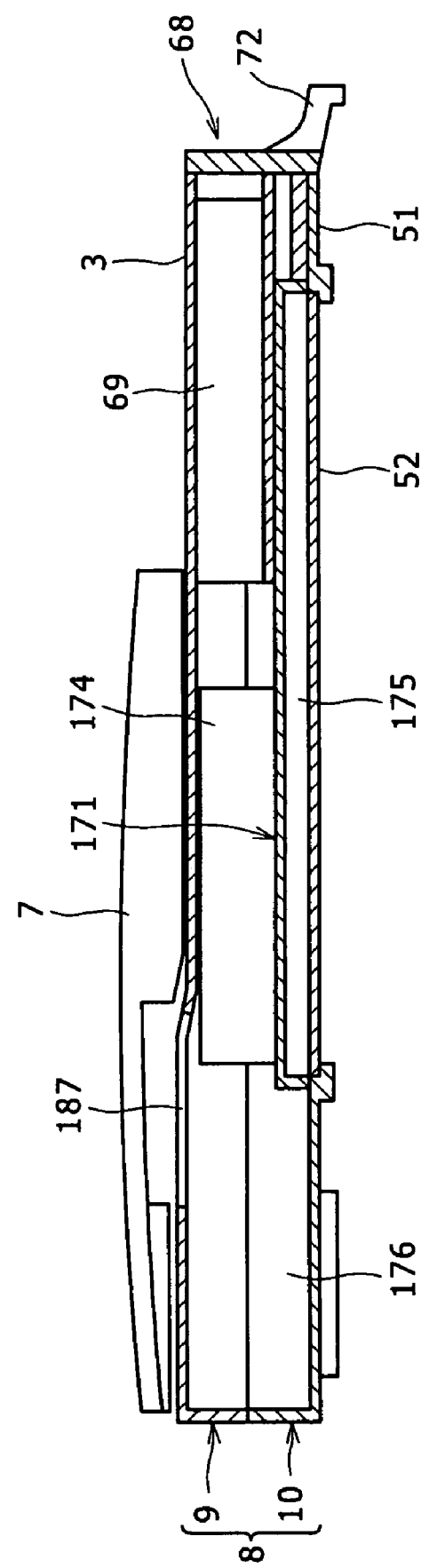
FIG. 5 is a cross sectional view of the housing in an assembled state.

One side portion of the partition plate 171 is positioned and held on an inner surface side of the second end face 68. First and second arm portions 172 and 173 are provided in the other side portion of the partition plate 171. Using the second end face 68 and the first and second arm portions 172 and 173, the partition plate 171 is disposed substantially parallel with the first and second major faces 3 and 51 between the first and second major faces 3 and 51. With reference to FIG. 5, the inside of the housing 8 is partitioned by the partition plate 171 into a first component containing space 174 positioned between the partition plate 171 and the first major face 3 of the housing 8; a second component containing space 175 positioned between the partition plate 171 and the second major face 51 of the housing 8; and a third component containing space 176 without presence of the partition plate 171. Numeral 52 denotes a transparent liquid crystal (LC) display window provided to the second major face 51.

Figure 6:
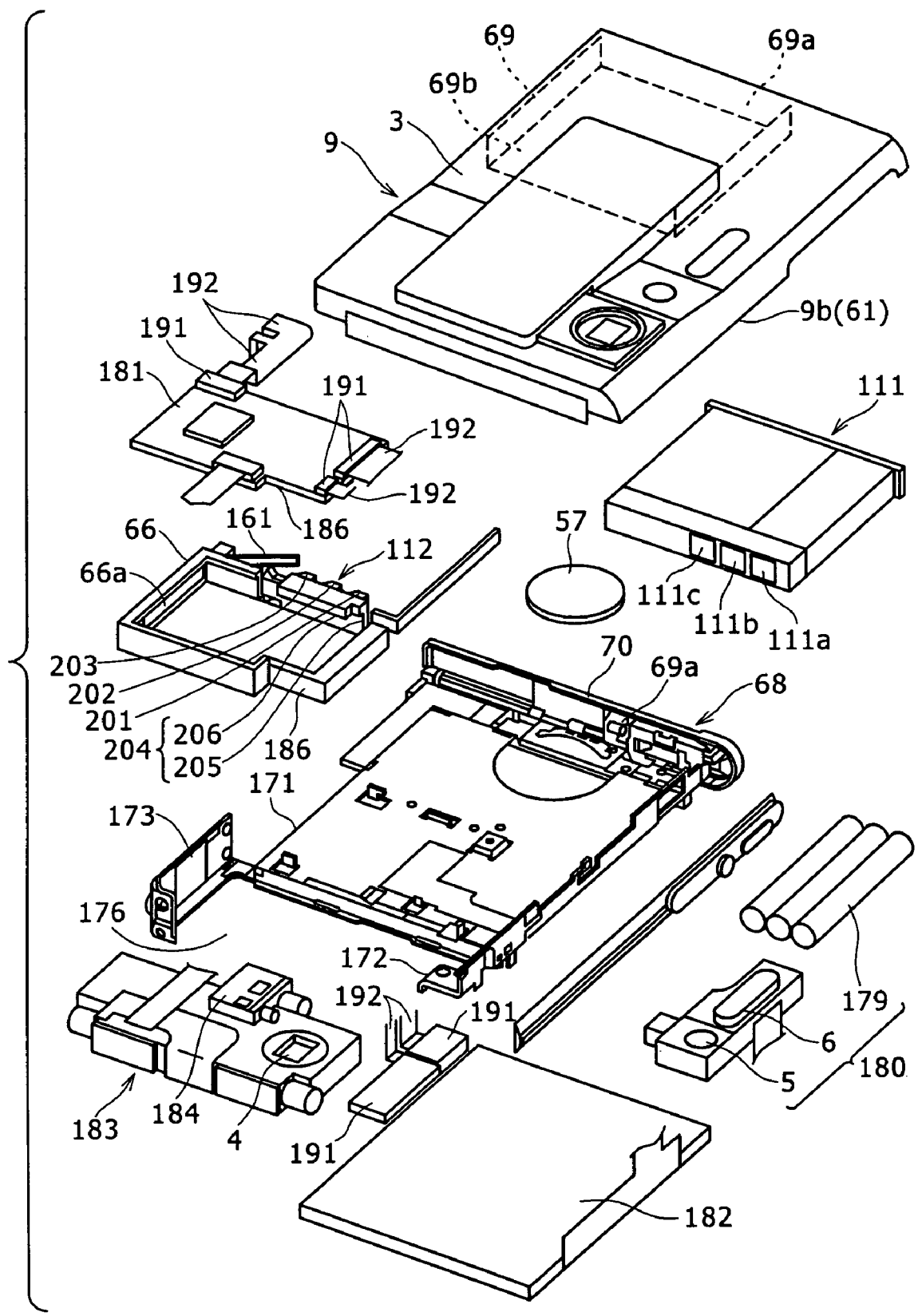
FIG. 6 is an exploded perspective view of the housing and various components.
Figure 8:
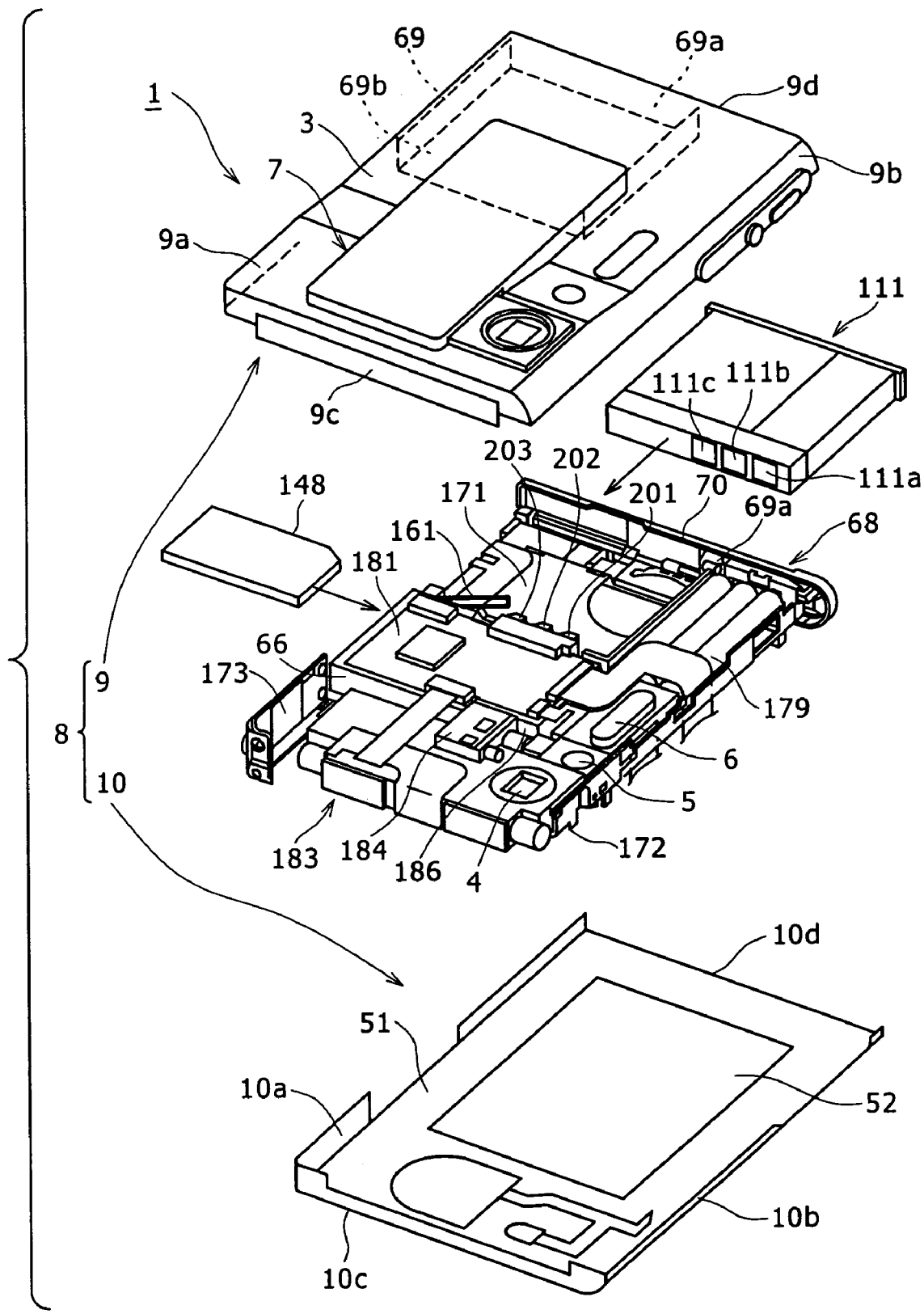
FIG. 8 is a perspective view of a state where various components are assembled on the partition plate.

With reference to FIGS. 6 and 8, in the first component containing space 174, there are disposed, but not limited to, a strobe unit 180 including the AF illuminator 5, a flash emission section 6, and a condenser 179; the memory card containing section 66; a main printed circuit board 181; the device side terminal portion 112; a speaker 57; and the battery compartment portion 69.

The battery compartment portion 69 is provided to an inner surface of the first major face 3 of the upper cover plate 9. The battery compartment portion 69 is formed into a substantially flat, rectangular parallelepiped shape, in which opening portion 69a on the second end face 68 of the housing 8 functions as a battery insertion/removal slot. When the upper cover plate 9 has been assembled onto the partition plate 171, the battery compartment portion 69 is positioned on the partition plate 171.

The printed circuit board 181 is mounted in the state where it overlaps with the memory card containing section 66. The memory card containing section 66 is disposed such that an opening portion 66a faces a substantially center portion of the first end face 65 of the housing 8. The device side terminal portion 112 is provided in one side portion of the memory card containing section 66. The device side terminal portion 112 faces an opening portion 69b on the depth-wise end side of the battery compartment portion 69. When a battery 111 is stored into the battery compartment portion 69 from the opening portion 69a of the battery compartment portion 69, terminals of on the side of the battery 111 contact the device side terminal portion 112 provided on the one side portion of the memory card containing section 66.

The AF illuminator 5 and the flash emission section 6 are disposed between the memory card containing section 66 and the third end face 61 of the housing 8. The condenser 179 is disposed between the battery compartment portion 69 and the third end face 61 of the housing 8.

A liquid crystal (LC) panel 182 is disposed in the second component containing space 175. The LC panel 182 is supported on the partition plate 171. A display screen of the LC panel 182 is displayed to be visible through the transparent LC display window 52 provided to the second major face 51 of the lower cover plate 10.

A lens unit 183 is disposed in the third component containing space 176. The lens unit 183 includes an optical system vertically arranged with a prism to thereby bend the optical axis, whereby slender, thin lenses with an optical zoom function are used. The imaging lens 4 is disposed on the one-end side of the lens unit 183. The lens unit 183 is stored in the third component containing space 176 in the state where the imaging lens 4 is positioned on the third end face 61 side of the housing 8, i.e., in a side portion of the AF illuminator 5.

Figure 7:
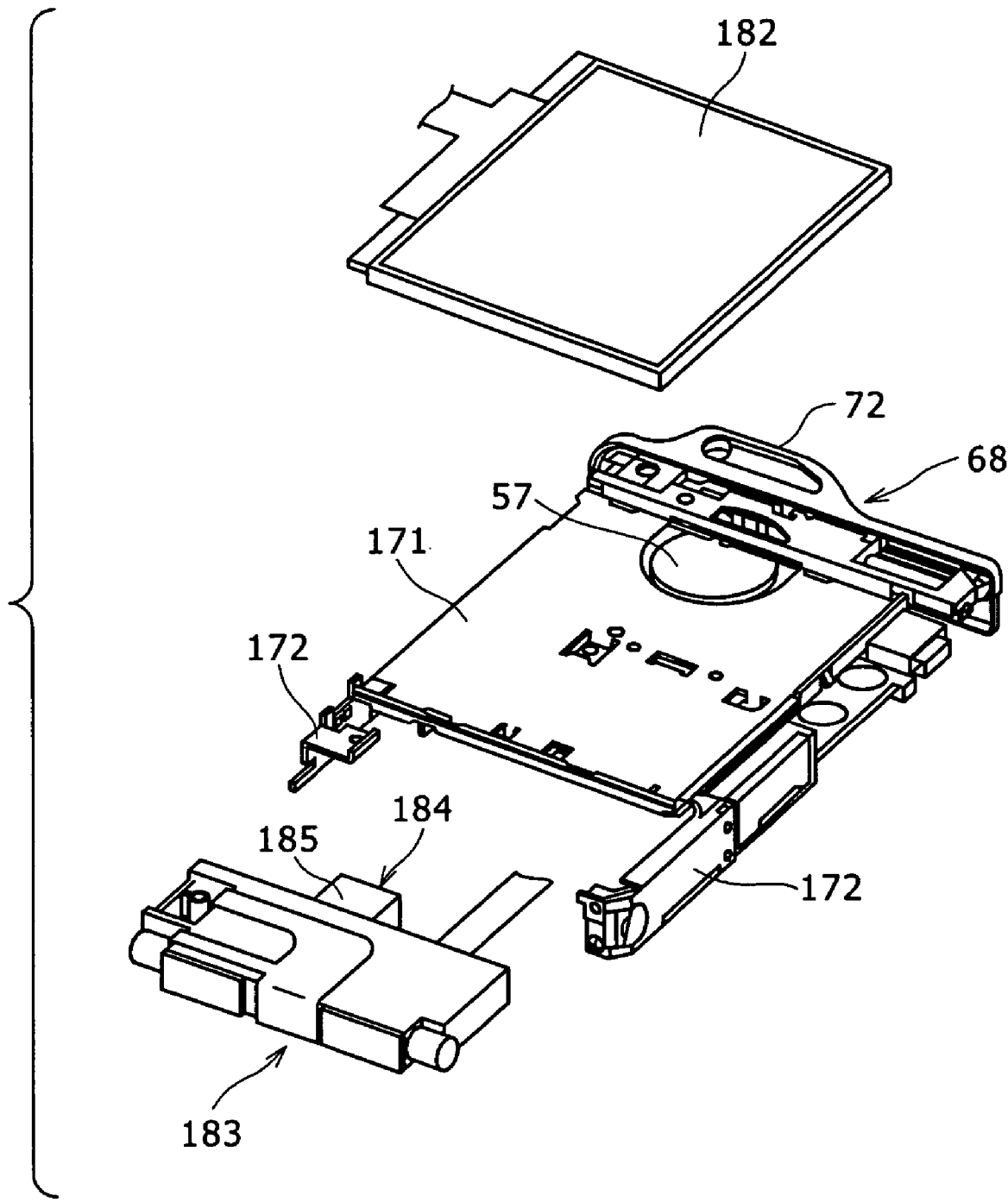
FIG. 7 is a perspective view of the relationship among a partition plate, a liquid crystal panel, and an optical unit.
Figure 10:
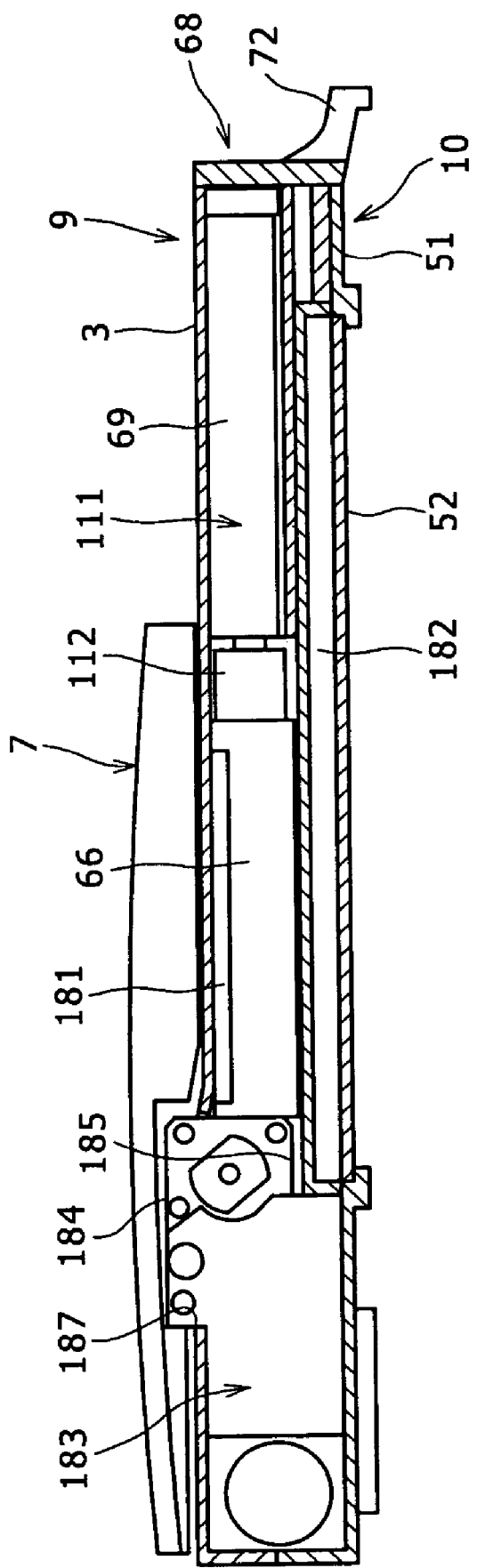
FIG. 10 is a cross sectional view of a state where various components are assembled on the partition plate.

The iris drive mechanism 184 is provided on the one side portion of the lens unit 183, in which at least one portion of the iris drive mechanism 184 enters into the first component containing space 174. At least one portion of the iris drive mechanism 184 is deformed (protruded) to the side of the barrier 7. As shown in FIG. 7, at least a portion of a bottom face 185 of the iris drive mechanism 184 is provided in a recessed position to be capable of receiving the one-end side of the LC panel 182. As shown in FIG. 10, with the recessed portion 185 thus existing in the recessed position, the LC panel 182 can be disposed closer to the side of the lens unit 183.

As shown in FIG. 6, a cutout portion 186 for receiving the portion of the iris drive mechanism 184 is provided to the printed circuit board 181.

Figure 9:
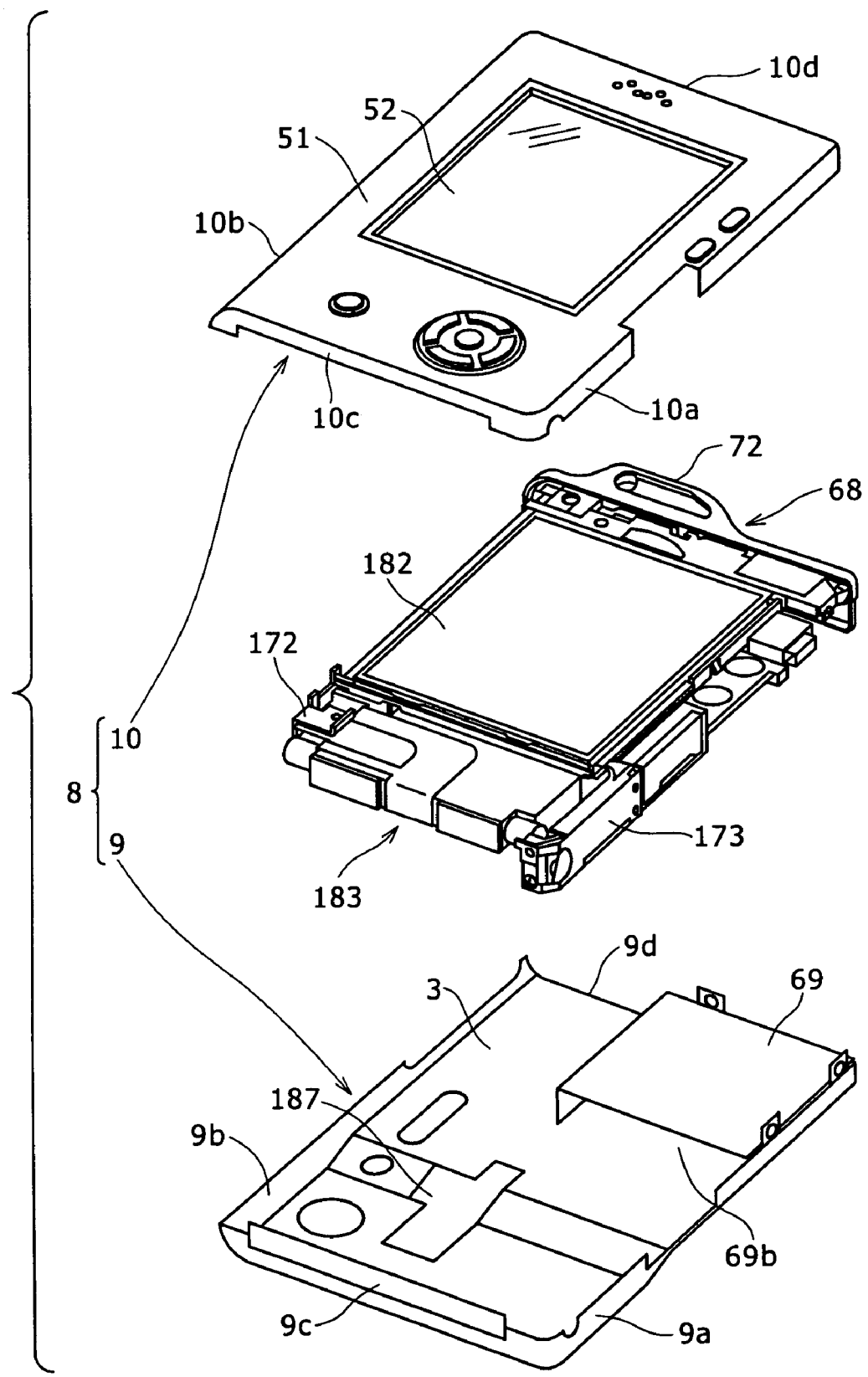
FIG. 9 is a perspective view of a state where various components are assembled on the partition plate.

As shown in FIG. 9, the at least one portion of the iris drive mechanism 184 deformed to the first major face 3 side of the housing 8 is received in a protrusion-portion receiving opening 187 provided to the first major face 3 of the housing 8, whereby protruding from the first major face 3 of the housing 8 through the protrusion-portion receiving opening 187. As shown in FIGS. 1A and 1B, the one portion of the iris drive mechanism 184 is covered by the barrier 7 slidably provided on the outer face of the first major face 3 of the housing 8. As shown in FIG. 6, the printed circuit board 181 is coupled to the respective components through multiple connectors 191 and harnesses 192.

Figure 11:
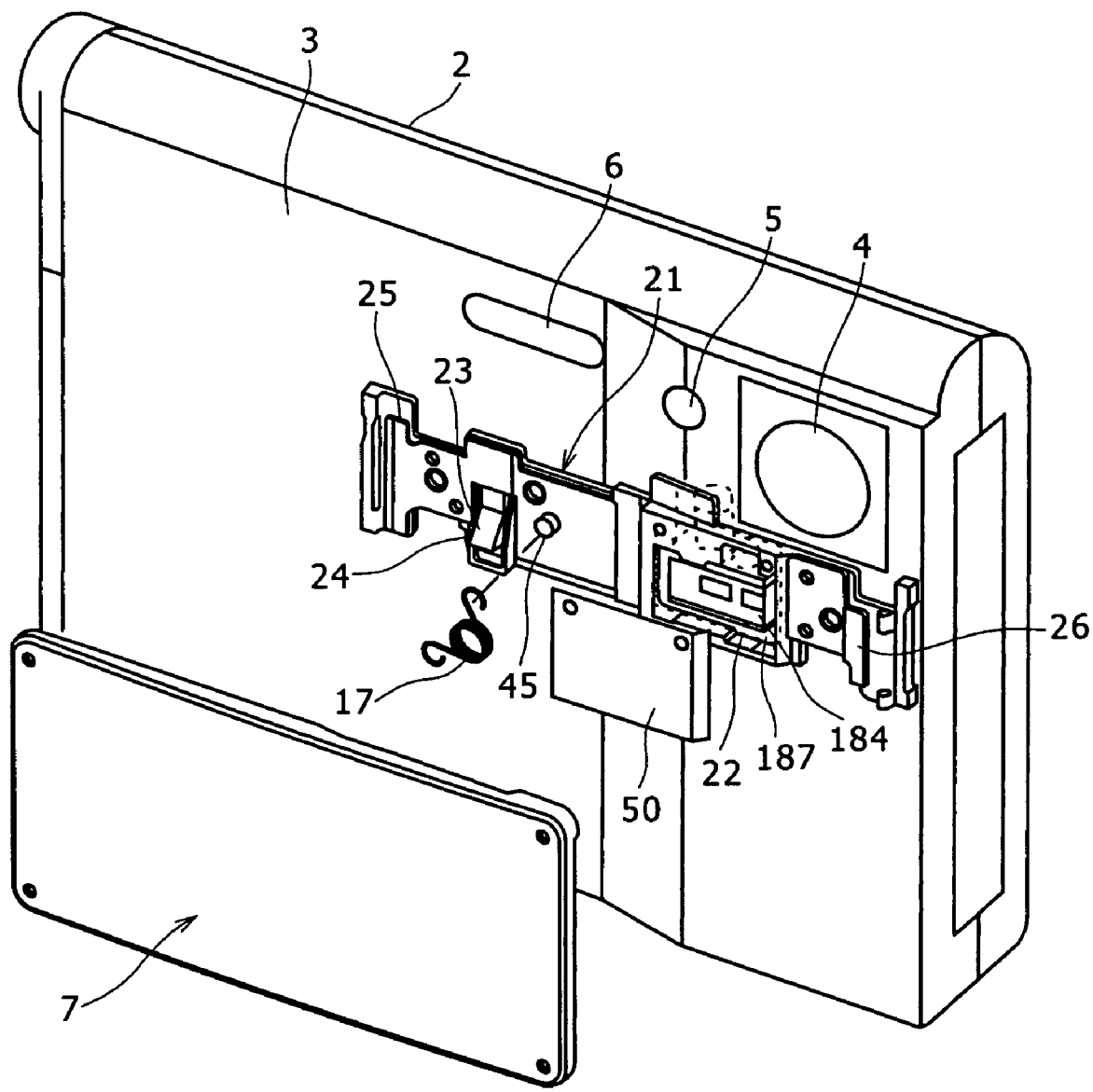
FIG. 11 is a perspective view of a state where the barrier is removed.

FIG. 11 shows a state where the barrier 7 is removed. The imaging lens 4 is disposed to face one corner portion on an upper end side of the first major face 3 of the flat, rectangular parallelepiped housing 8. The AF illuminator 5 and the flash emission section 6 are disposed on the one side portion of the imaging lens 4.

A base plate 21 is mounted in a lower portion of the imaging lens 4, the AF illuminator 5, and the flash emission section 6. A first opening portion 22 is provided on the base plate 21, and one portion of the iris drive mechanism 184 is stored in the first opening portion 22. A second opening portion 23 is provided to the base plate 21. A switch operation unit 24 is disposed in the second opening portion 23. The switch operation unit 24 is used to operate a barrier position detection switch (not shown) is provided in the housing 8 for detecting whether the barrier 7 stays in the first position or the second position. The pair of first and second barrier engagement bodies 25 and 26 constituting the first and second barrier slide guide portions 15 and 16 are, respectively, provide to two side portions of the base plate 21.

Figure 12:
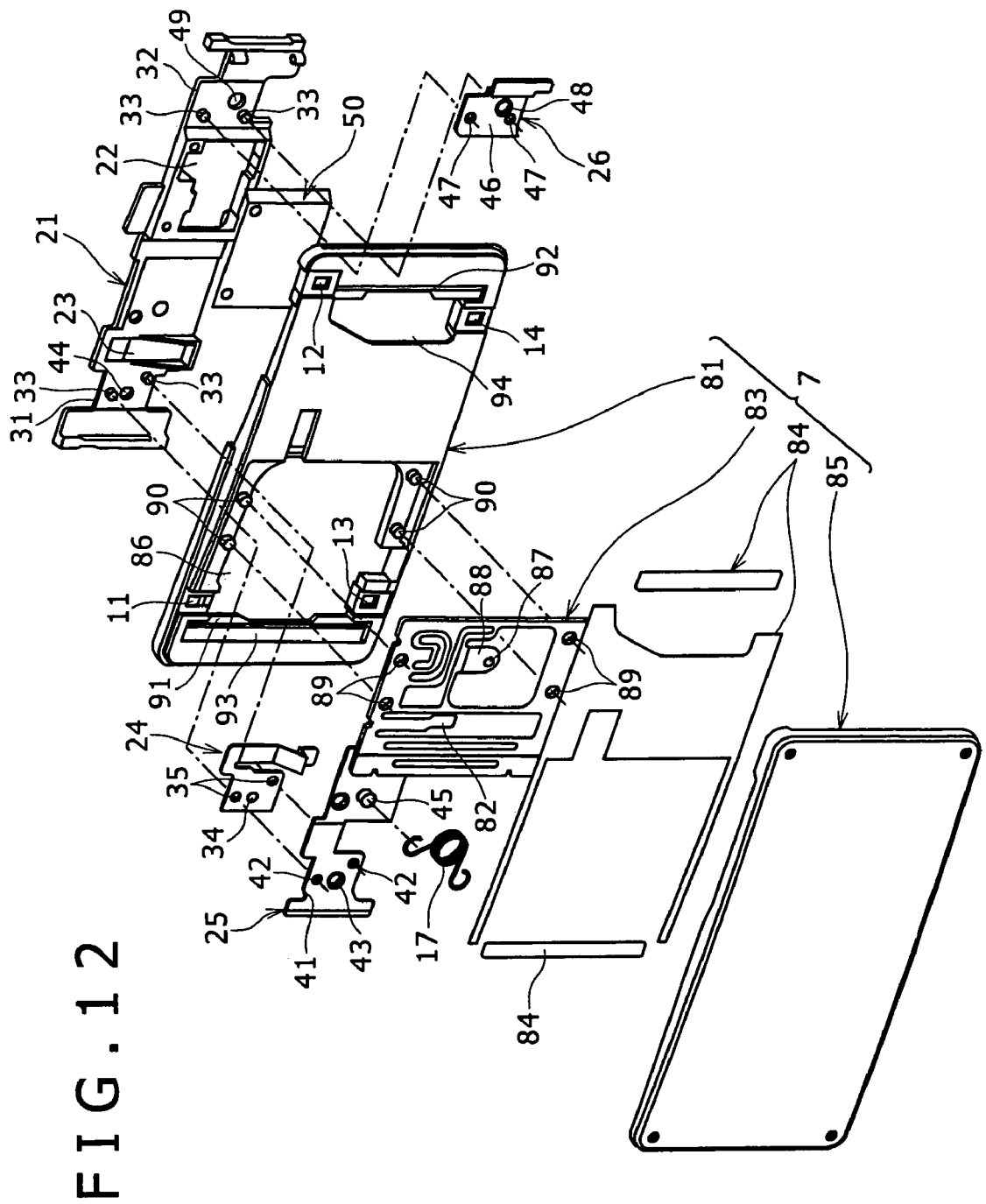
FIG. 12 is an exploded perspective view of the barrier.

With reference to an exploded perspective view of FIG. 12, on the base plate 21, first and second barrier engagement body mounting portions 31 and 32 for mounting the first and second barrier engagement bodies 25 and 26 are provided to two side portions of the first and second opening portion 22 and 23. A plurality of boss portions 33 are provided to the first and second barrier engagement body mounting portions 31 and 32.

The switch operation unit 24 is formed by bending a leaf spring in such a form as the letter V. A mount base 34 for being used to mount the switch operation unit 24 onto the second opening portion 23 is provided in one side portion of the switch operation unit 24. A plurality of boss insertion holes 35 for receiving inserted boss portions 33 provided in the first barrier engagement body mount portion 31 are provided on the mount base 34.

The switch operation unit 24 is mounted in the manner that the plurality of boss portions 33 respectively are inserted into the plurality of boss insertion holes 35, which are provided on the mount base 34, in the state where the switch operation unit 24 is inserted into the second opening portion 23.

The first barrier engagement body 25 is formed by bending a metal plate. A mount base 41 for the use of mounting the first barrier engagement body 25 onto the base plate 21 is provided in one side portion of the first barrier engagement body 25. A plurality of boss insertion holes 42 for receiving the inserted boss portions 33 provided in the first barrier engagement body mount portion 31 are provided on the mount base 41.

As described above, the respective boss portions 33 provided in the first barrier engagement body mount portion 31 are inserted into the boss insertion holes 35 provided on the mount base 34. Thereafter, the respective boss portions 33 are inserted into the boss insertion holes 42 provided on the mount base 41, and front end portions of the boss portions 33 are widened in their diameters by so-called caulking. Thereby, the first barrier engagement body 25 is mounted to the first barrier engagement body mount portion 31 in the state where the mount base 34 of the switch operation unit 24 is sandwiched between the mount portion and the first major face 3 of the housing 8. A plurality of positioning bosses 43 is provided on the mount base 41 of the first barrier engagement body 25.

The positioning bosses 43 each function to position the first barrier engagement body 25 by fitting into a boss insertion hole 44 provided to the base plate 21 when the first barrier engagement body 25 is mounted to the first barrier engagement body mount portion 31. A first spring anchoring portion 45 for anchoring a one-end portion of the toggle spring 17 is provided on the mount base 41 of the first barrier engagement body 25.

Similarly as the first barrier engagement body 25, the second barrier engagement body 26 is formed by bending a metal plate. A mount base 46 for mounting the second barrier engagement body 26 onto the base plate 21 is provided in one side portion of the second barrier engagement body 26. A plurality of boss insertion holes 47 for receiving the inserted boss portions 33 provided in the second barrier engagement body mounting portion 32 is provided on the mount base 46.

The respective boss portions 33 provided in the second barrier engagement body mount portion 32 are inserted into boss insertion holes 47 provided on the mount base 46. Then, front end portions of the boss portions 33 are widened in their diameters by so-called caulking. Thereby, the second barrier engagement body 26 is mounted in the second barrier engagement body mounting portion 32. A plurality of positioning bosses 48 is provided on the mount base 46 of the second barrier engagement body 26. The positioning bosses 48 each function to position the second barrier engagement body 26 by fitting into a boss insertion hole 49 provided to the second barrier engagement body mounting portion 32 when the second barrier engagement body 26 is mounted to the second barrier engagement body mounting portion 32.

The first opening portion 22 provided on the base plate 21 is closed by an iris cover sheet 50, thereby to block entrance of foreign matter such as dusts into the housing 8 from the first opening portion 22.

As shown in FIG. 2A, the LC display window 52, a mode switch 53, a menu button 54, a control button 55, a screen display on/off button 56, the speaker 57 are provided on the second major face 51 opposing the first major face 3 of the housing 8. In addition, a microphone 62, a zoom button 63, and a shutter button 64 are provided on the third end face 61 (upper end portion) connecting between the first major face 3 and the second major face 51.

(3) Configurations of Battery and Device Side Terminal Portion for Being Contacted with Battery With reference to FIG. 6, the battery 111 is formed into a flat, rectangular parallelepiped shape, and includes a positive terminal 111a, a control objective 111b, and a negative terminal 111c on a front end surface. The device side terminal portion 112 includes a device side positive terminal 201 for contacting the positive terminal 111a of the battery 111; a device side control terminal 202 for contacting the control objective 111b of the battery 111; and a device side negative terminal 203 for contacting the control terminal 111b of the battery 111. In addition, the terminal portion 112 includes a terminal holder 204 that holds and couples the device side positive terminal 201, control terminal 202, and negative terminal 203 to the printed circuit board 181.

Figure 38:
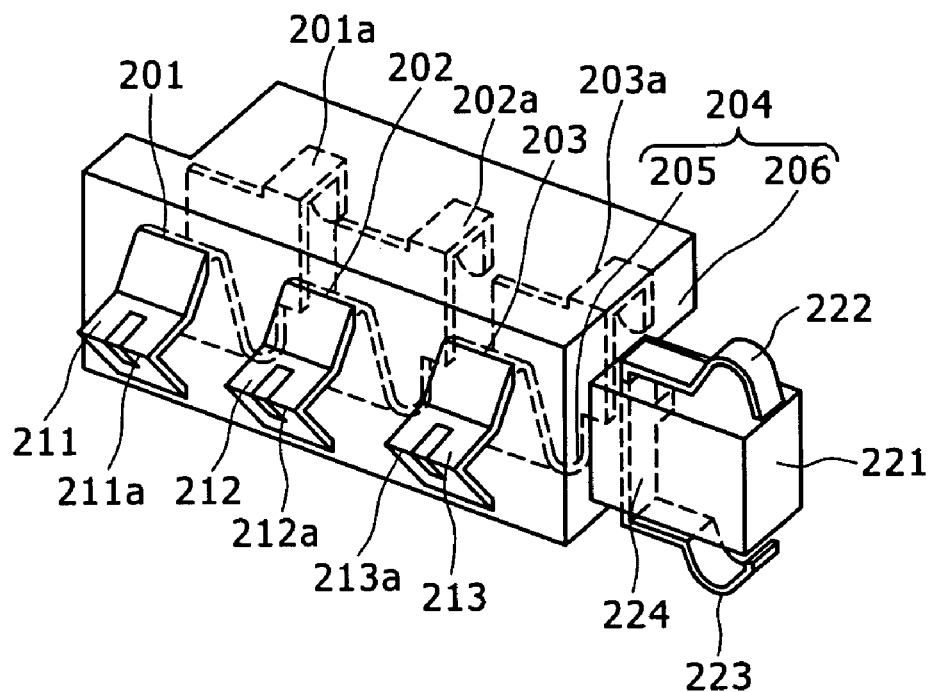
FIG. 38 is a perspective view of a first embodiment of a device side terminal portion.

With reference to an enlarged view of FIG. 38, the terminal holder 204 includes a holder body portion 205 and a printed circuit board overlap portion 206 formed to protrude to one side surface of the holder body portion 205, thereby being formed to have a substantially "L" shaped cross section.

Figure 39:
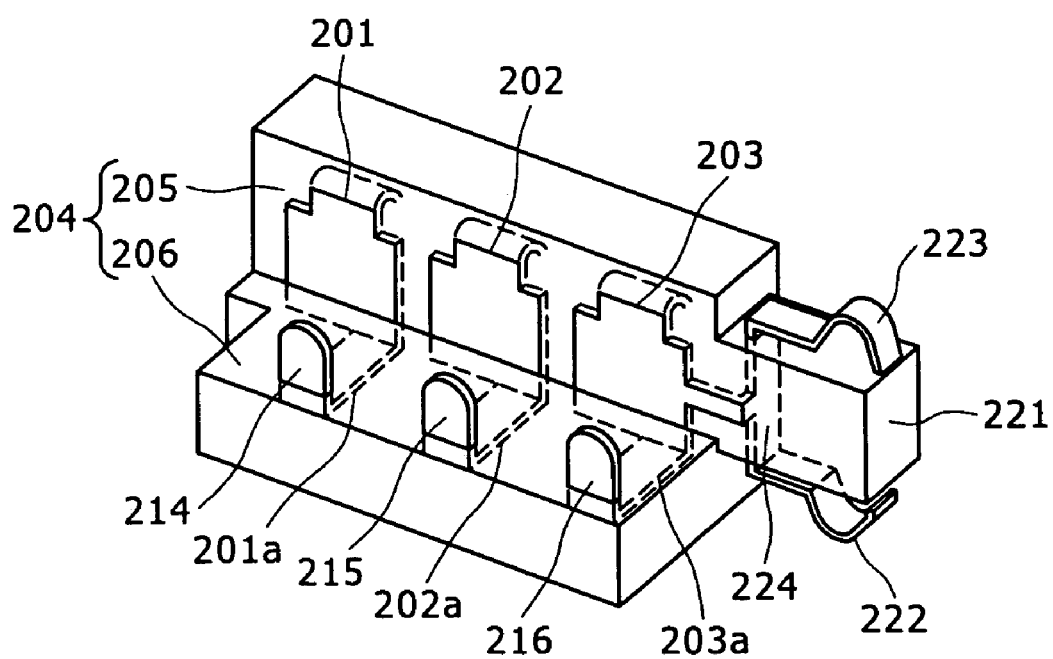
FIG. 39 is perspective view of a reversed state of the device side terminal portion.

The positive terminal 201 is provided such that a central portion thereof is embedded in the terminal holder 204. A one-end side of the respective positive terminal 201 protrudes from the surface of the holder body portion 205. A contact 211 is formed by bending the protrusion portion into a substantially "V" shape, and is used for being contacted by the positive terminal 111a of the battery 111. With reference to FIG. 39, the other-end side of the positive terminal 201 is formed to protrude from an upper surface of the printed board lap portion 206 so as to be used as a printed circuit board connection portion 214. The control terminal 202 and the negative terminal 203 are formed in substantially the same manner as the positive terminal 201. That is, respective contacts 212 and 213 thereof contact the control terminal 111b and negative terminal 111c of the battery 111, and the other end side portions are formed to be used as printed circuit board connection portions 215 and 216.

Figure 40:
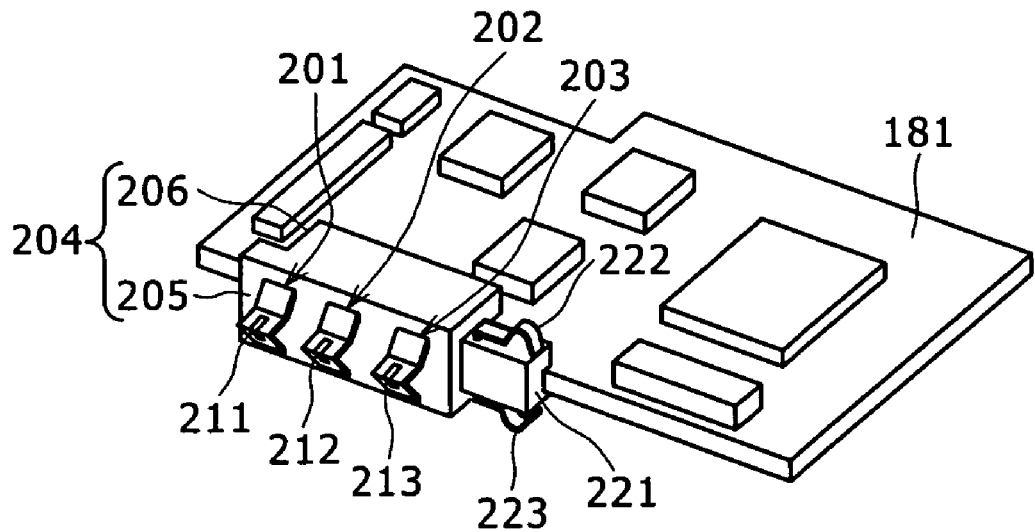
FIG. 40 is a perspective view of a state where the device side terminal portion is mounted on a printed circuit board.
Figure 41:
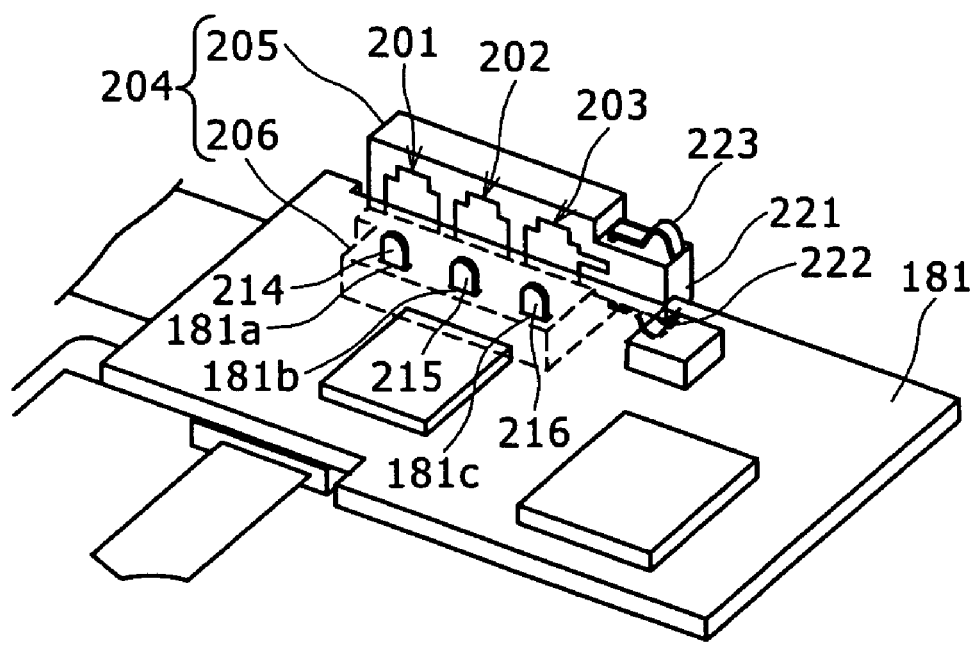
FIG. 41 is a perspective view of a reversed state of the printed circuit board.

With reference FIG. 40, when the main printed circuit board 181 is overlapped with a bottom face of the printed board lap portion 206, the printed circuit board connection portions 214, 215, and 216 protrude to the side of the upper surface of the main printed circuit board 181 through connection portion lead-out openings 181a, 181b, and 181c provided to the main printed circuit board 181. Thereby, the printed circuit board connection portions 214, 215, and 216 are soldered to the main printed circuit board 181.

As shown in FIG. 39, a protrusion portion 221 is provided on one side portion of the holder body portion 205. First and second ground terminals 223 and 224, respectively, are provided on upper and lower surfaces of the protrusion portion 221. The ground terminals 222 and 223 are connected to the device side negative terminal 203 via a lead portion 224.

Figure 42:
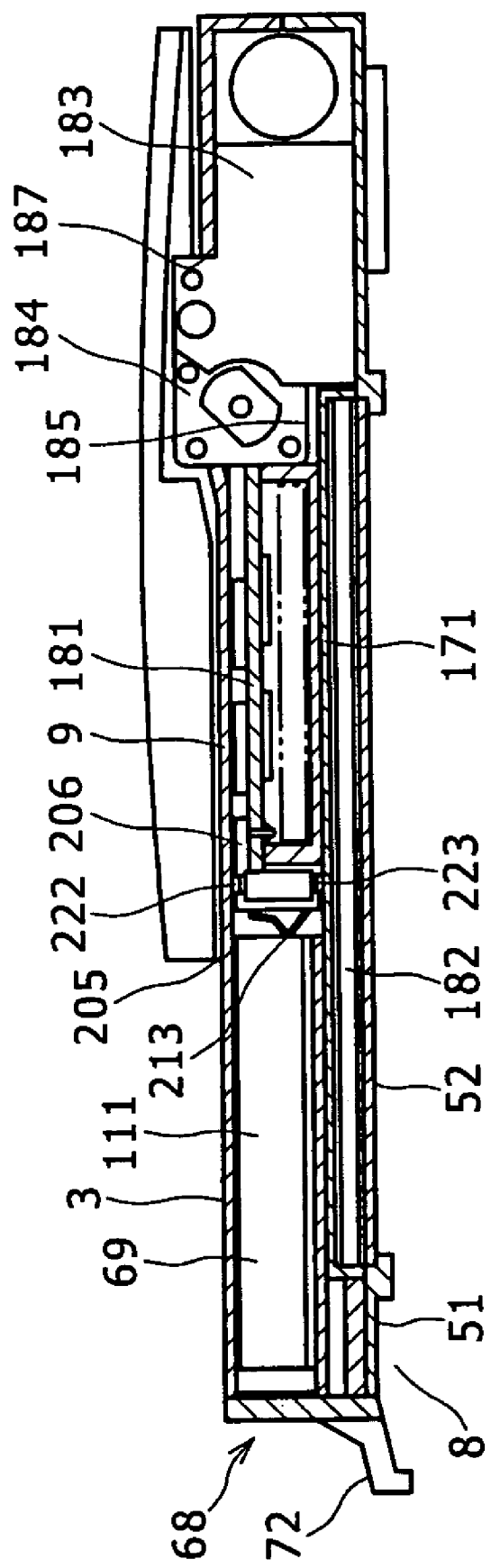
FIG. 42 is a cross sectional view of a state where ground terminals are in contact.
Figure 43:
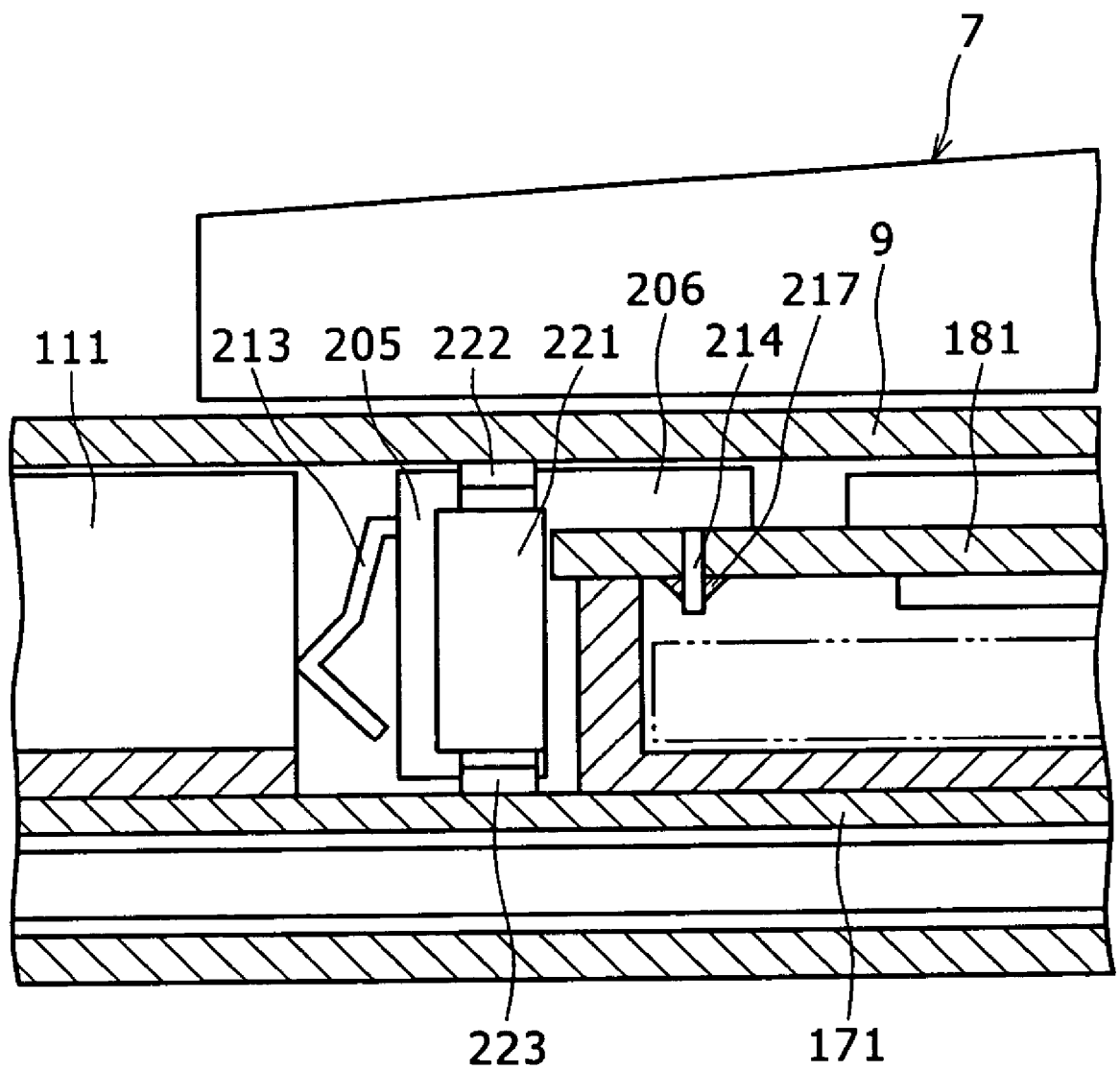
FIG. 43 is an enlarged view of an essential portion of FIG. 42.

With reference to FIGS. 42 and 43, the first ground terminal 222 contacts the metal upper cover plate 9, and the ground terminal 223 provided on the lower surface of the protrusion portion 221 contacts the metal partition plate 171.

FIGS. 44 to 48 show a second embodiment of a device side terminal portion 112. In this embodiment, similarly as the case in the first embodiment, a terminal holder 204 is formed into the shape of substantially the letter L from a holder body portion 205 and a printed circuit board overlap portion 206 formed to protrude to the one side surface of the holder body portion 205. The terminal holder 204 includes a positive terminal fixing portion 231 for fixing the positive terminal 201, a control terminal fixing portion 232 for fixing the control terminal 202, a negative terminal fixing portion 233 for fixing the negative terminal 203, and an ground terminal fixing portion 234 for fixing the ground terminal 223.

The positive terminal fixing portion 231 includes a contact reception opening 241 provided in the holder body portion 205; a groove-shaped recessed portion 242 provided in the printed board lap portion 206 successively to the contact reception opening 241; first terminal engagement portions 243 provided two side portions of the contact reception opening 241; and a so-called "dovetail-mortise shaped" second terminal engagement portion 244 provided in an upper portion of the recessed portion 242. The control terminal fixing portion 232 and the negative terminal fixing portion 233 are formed in substantially the same manner as the positive terminal fixing portion 231. The ground terminal fixing portion 234 is formed in the manner that a recessed portion is provided to the holder body portion 205, and the upper and lower surfaces thereof are cut out.

The positive terminal 201, the control terminal 202, the negative terminal 203, and the ground terminals 222 and 223 will be described herebelow.

The positive terminal 201 includes a contact 211 provided in a one-end portion of a base portion 201a, and a printed circuit board connection portion 214 provided in the other-end portion of the base portion 201a to be substantially parallel to the contact 211.

First tab-shaped protrusions 251 for engagement with the first terminal engagement portions 243 provided on two side portions of the contact reception opening 241 are provided in two side portions on the lower end side of the contact 211. In addition, second tab-shaped protrusions 252 for engagement with the second terminal engagement portions 244 provided on two side portions on the lower end side of the recessed portion 242 are provided in two side portions of the base portion 201a.

Figure 46:
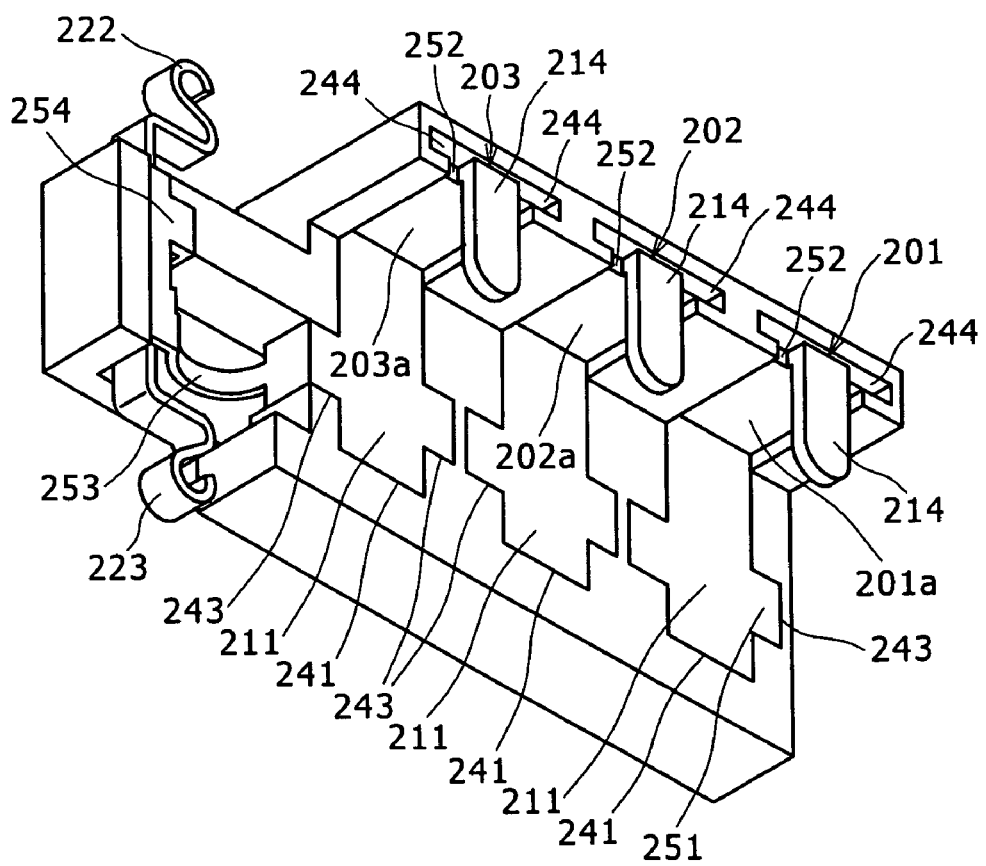
FIG. 46 is a perspective view of a state where terminals are mounted to the terminal holder.
Figure 47A:
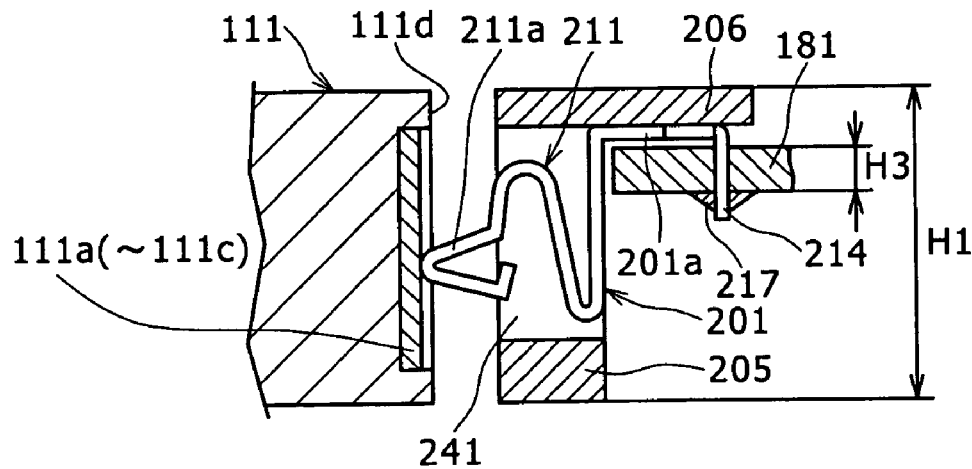
FIG. 47A is a cross sectional view of a state where a front end of the battery is in abutment with a contact.

With reference to FIG. 46, the positive terminal 201 is mounted to the holder body portion 205 in the manner that the contact 211 is inserted into the contact reception opening 241, the first tab-shaped protrusions 251 are engaged with the first terminal engagement portions 243, and the second tab-shaped protrusions 252 are engaged with the second terminal engagement portion 244. Then, as shown in FIG. 47A, in the state where a front end portion 211a (portion for contacting the battery side terminal) of the contact 211 is protruded from one side surface of the holder body portion 205, it is positioned and fastened to the terminal holder 204.

The control terminal 202 and the negative terminal 203 are formed and mounted to the terminal holder 204 in a manner similar to the positive terminal 201.

Figure 48:
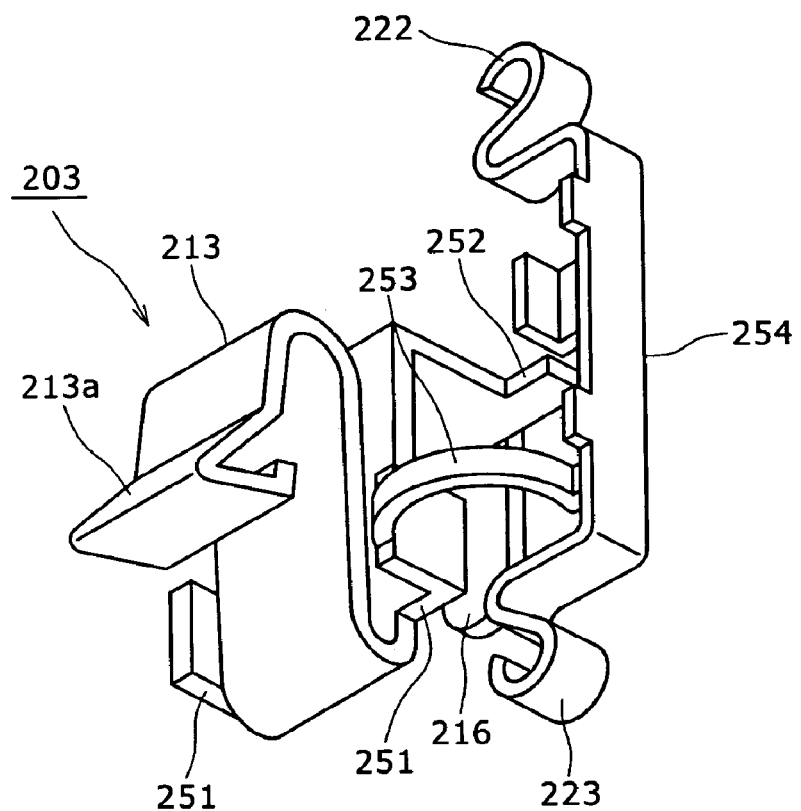
FIG. 48 is a perspective view of a negative terminal and a ground terminal.
Figure 49:
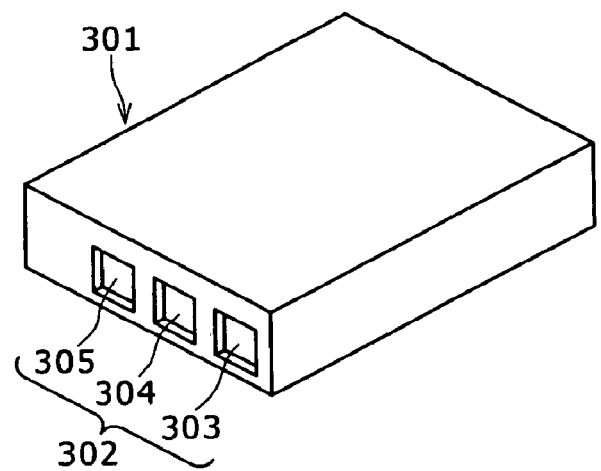
FIG. 49 is a perspective view of an example of battery.
Figure 50:
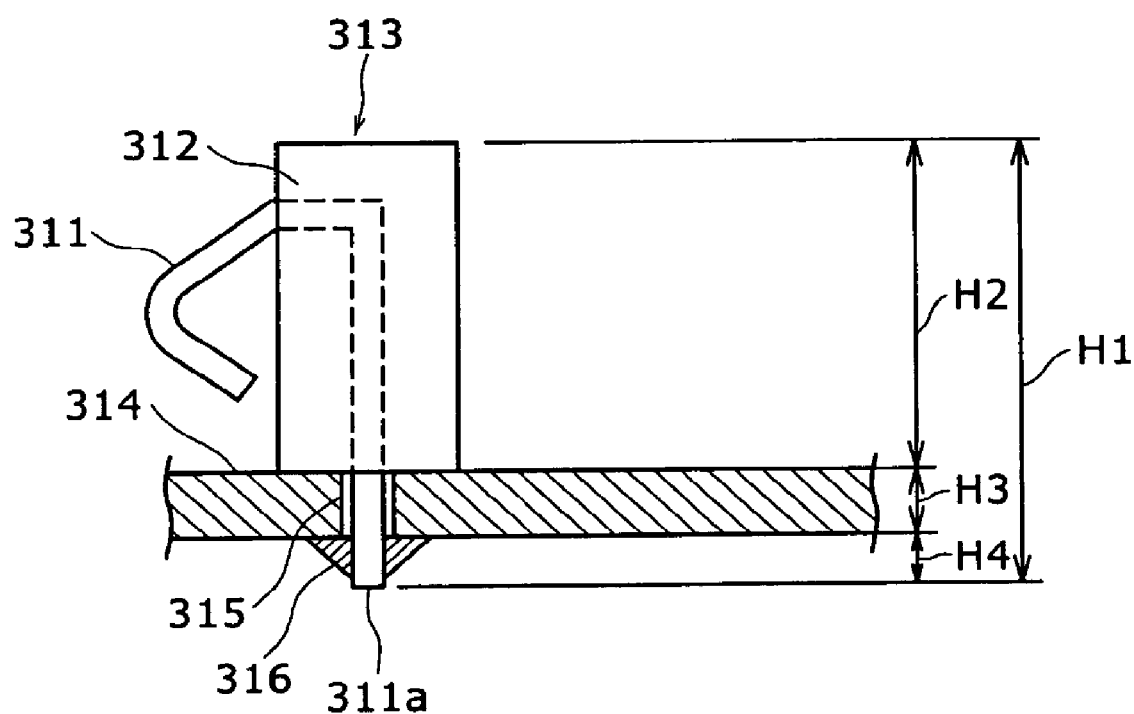
FIG. 50 is a cross sectional view descriptive of problems.

As shown in FIG. 48, a ground terminal base portion 254 is provided in one side portion of the negative terminal 203 through an arch portion 253 in the shape of substantially the letter U, and the upper and lower pair of first and second ground terminals 223 and 224.

Figure 44:
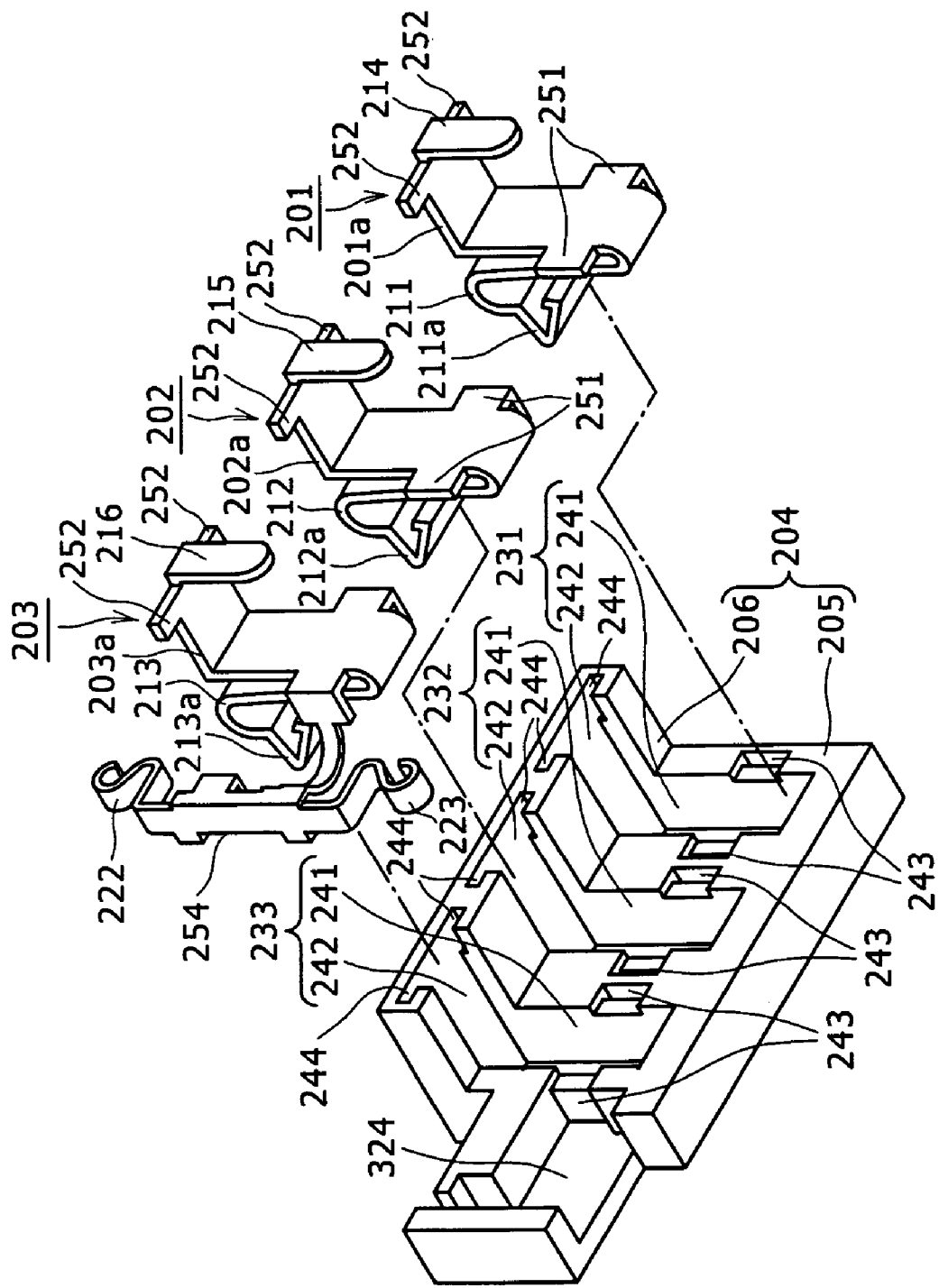
FIG. 44 is a perspective view of a second embodiment of a terminal holder.
Figure 45:
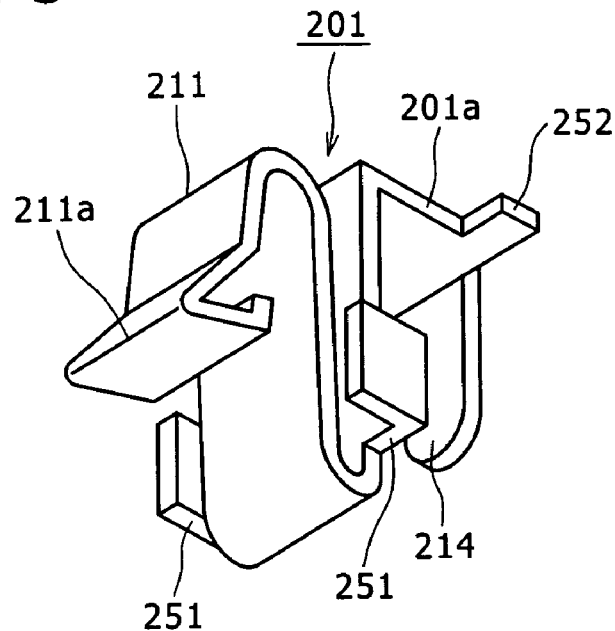
FIG. 45 is a perspective view of a positive terminal.

When the negative terminal 203 is mounted to the negative terminal fixing portion 233 shown in FIG. 44, then the ground terminal base portion 254 is stored into the ground terminal fixing portion 234, and the upper and lower pair of the ground terminals 222 and 223 are protruded from the upper and lower surfaces of the holder body portion 205. The substantially U-shaped arch portion 253 can securely be mounted by elasticity thereof to the ground terminal fixing portion 234, notwithstanding a dimensional error or the like in the ground terminal fixing portion 234. The negative terminal 203 and the ground terminals 222 and 223 are each integrally formed by bending a single metal sheet.

As described above, in the present embodiment, the printed board lap portion 206 is provided in the upper end portion of the terminal holder 204, and the main printed circuit board 181 is overlapped with the lower surface of the printed board lap portion 206. However, conversely, the configuration may be such that the printed circuit board overlap portion 206 is provided in the lower end portion of the terminal holder 204, and the main printed circuit board 181 is overlapped with the upper surface of the printed board lap portion 206.

Figure 47B:
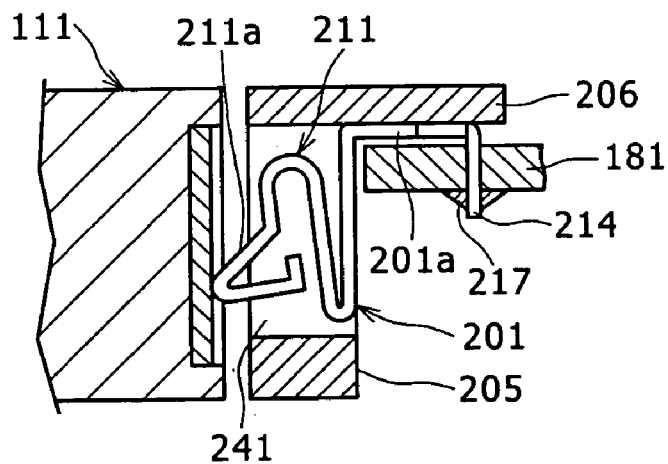
FIG. 47B is a cross sectional view of a state where a contact of a terminal is pressed by the battery.
Figure 47C:
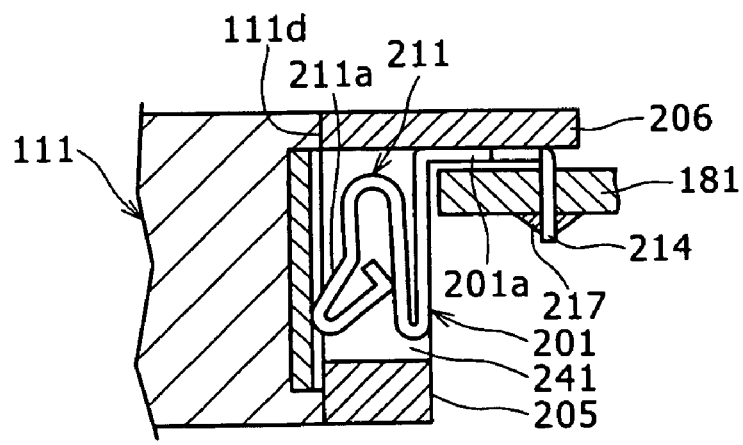
FIG. 47C is a cross sectional view of a state where the battery is fully stored.

The device side terminal portion 112 of the present embodiment is configured as described above. In the configuration, when the battery 111 is inserted into the battery compartment portion 69, then, as shown in FIGS. 47A and 47B, the front end portion front end portions 211a to 211c of the contacts 211 to 213 of the device side terminals 201 to 203 are compressed by the terminals 111a to 111c of the battery 111. Thereby, while being arcuately deformed, the contacts 211 to 213 are compressed into the contact reception opening 241. Then, as shown in FIG. 47C, a front end surface 111d of the battery 111 contacts a sidewall of the holder body portion 205, the battery 111 is completely stored in the battery compartment portion 69, and the respective contacts 211 to 213 are completely stored in the contact reception opening 241. Consequently, disposition spacing is not necessary, thereby to enable the device to be small.

As described above, in the device side terminal portion 112 according to the present invention, the printed circuit board overlap portion 206 to be overlapped with the printed circuit board 181 is provided on the one side surface of the holder body portion 205 of the terminal holder 204 including the plurality of terminals 201 to 203. Thereby, the main printed circuit board 181 is overlapped with the printed board lap portion 206. Accordingly, as shown in FIGS. 47A to 47C, a thickness H3 of the printed circuit board 181, for example, can be included in a height H1 of the holder body portion 205. Further, the device side terminal portion 112 is grounded by the provision of the ground terminals 222 and 223 thereto, so that static electricity can be prevented from being charged in the device side terminal portion 112, and shielding effects can be imparted to, for example, the cover in contact with the ground terminal.

(4) Configuration of Barrier

With reference to FIG. 12, the barrier 7 includes a frame-like inner body 81, a metal plate 83, and an outer body 85. On the metal plate 83, there is provided a switch operation unit depression portion 82 is attached to the frame-like inner body 81 and is used to perform depression operation of the second barrier engagement body 26. The outer body 85 is attached with a two-sided adhesive sheet or the like an outer face of the frame-like inner body 81.

A substantially rectangular cutout window portion 86 is provided in the inner body 81, and the metal plate 83 is formed to oppose the cutout window portion 86. The switch operation unit depression portion 82 is formed by a louvering process of the metal plate 83. In addition, a louver piece 88 (tongue) is formed by a louvering process of the metal plate 83. The louver piece 88 is provided with a second spring anchoring portion 87 that anchors the other-end portion of the toggle spring 17 of which the one-end portion is anchored to the first spring anchoring portion 45 provided in the mount base 41 of the first barrier engagement body 25.

A plurality of boss insertion holes 89 is provided in a peripheral portion of the metal plate 83. Bosses 90 provided in a peripheral portion of the cutout window portion 86 of the inner body 81 are inserted into the boss insertion holes 89, and front end of the bosses 90 are caulked to be widen in their diameters, whereby the metal plate 83 is mounted to the inner body 81.

Four corner portions of the inner body 81, respectively, are provided with the first to fourth rollers 11 to 14 for contacting the first major face 3 of the housing 8. Two side portions of the frame-like inner body 81 in the movement direction are provided with rail-shaped first and second barrier engagement body engagement portions 91 and 92 that, respectively, engages the first and second barrier engagement bodies 25 and 26 mounted on the base plate 21 and thereby move.

The first barrier engagement body engagement portion 91 is formed along one side portion of a first long opening 93 formed on one side portion of the frame-like inner body 81. The rail-shaped second barrier engagement body engagement portion 92 is formed along one side portion of a second long opening 94 formed in the other side portion of the inner body 81. The first and second barrier slide guide portions 15 and 16 are formed from the first and second barrier engagement bodies 25 and 26 and the first and second barrier engagement body engagement portions 91 and 92.

(5) Configurations of Rollers

Figure 13:
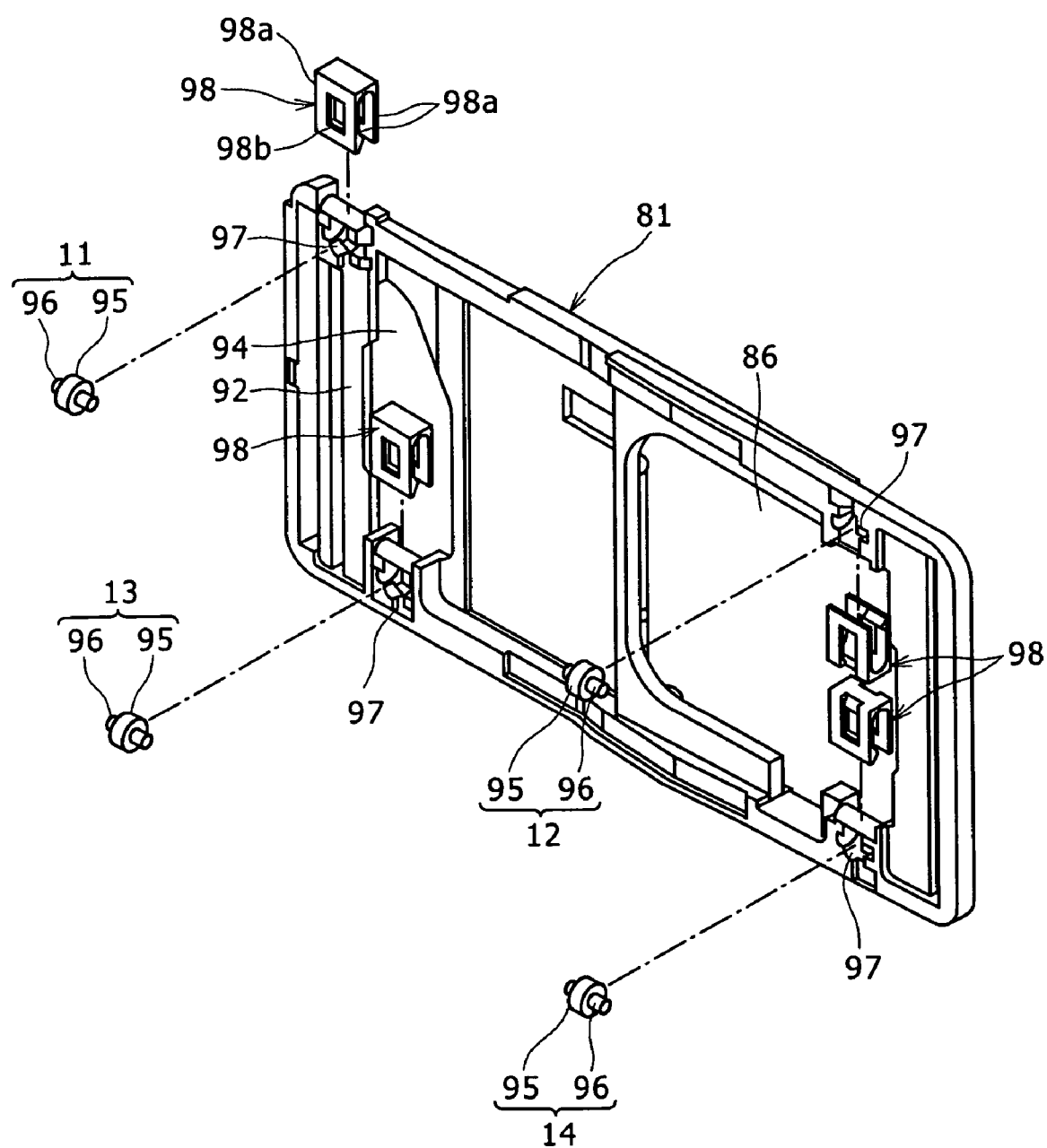
FIG. 13 is a perspective view showing mounting of rollers.

With reference to FIG. 13, the first to fourth rollers 11 to 14 each include a disc-shaped roller body portion 95 and the disc-shaped roller body portion 95 and a rotation center shaft 96 protruding from two side faces of the roller body portion 95. The first to fourth rollers 11 to 14 are, respectively, stored in first to fourth roller containing portions 97 provided in the four corner portions of the inner body 81, and are each rotatable about the rotation center shaft 96.

Clips 98, each being formed into the shape of the letter U (transverse), are attached from the lateral side to the first to fourth roller containing portions 97 containing the first to fourth rollers 11 to 14 to be rotatable are rotatably stored. Thereby, the first to fourth rollers 11 to 14 are prevented from falling off from the first to fourth roller containing portions 97. Cutout windows 98b are provided in a pair of opposing sides of the substantially U-formed clips 98. The disc-shaped roller body portion 95 protrudes from the cutout windows 98b.

When the inner body 81 is overlapped with the first major face 3 of the housing 8, the first to fourth rollers 11 to 14 contact the first major face 3 of the housing 8.

(6) Configurations of Barrier Slide Guide Slide Portions

Figure 14A:
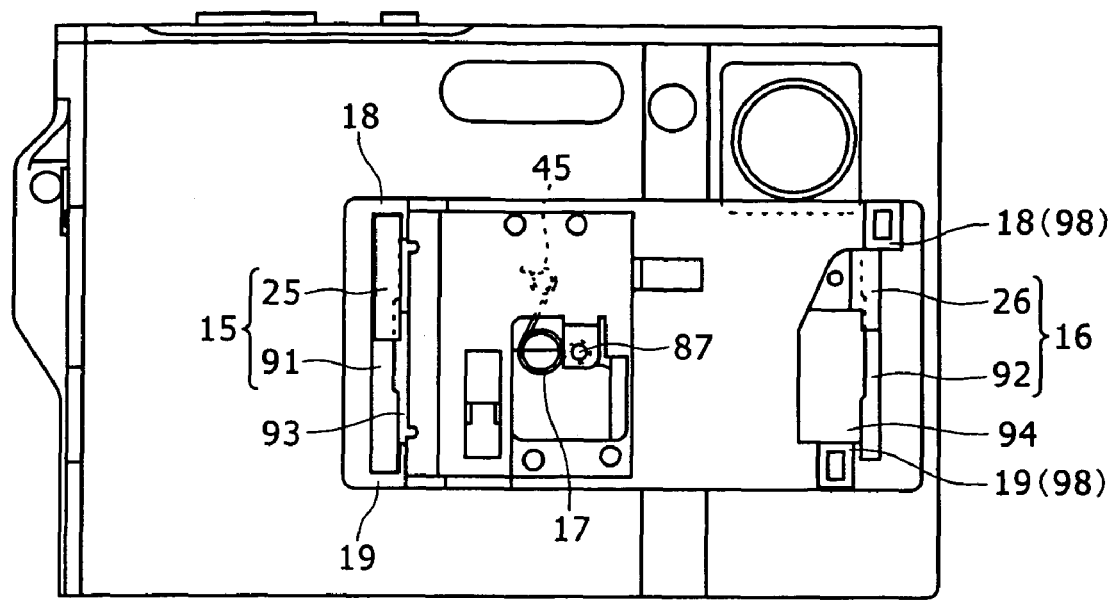
FIG. 14A is a view descriptive of operation of a toggle spring.
Figure 14B:
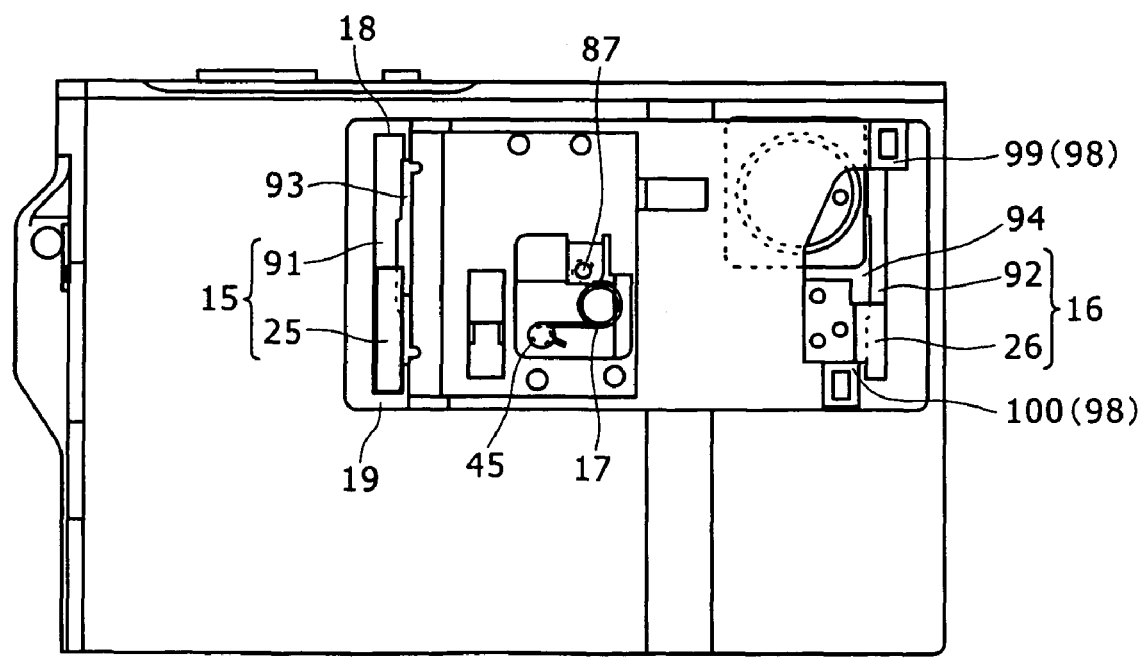
FIG. 14B is a view descriptive of operation of the toggle spring.

Literally, the first and second barrier slide guide portions 15 and 16 guide movement of the barrier 7. With reference to FIGS. 14A and 14B, the first barrier slide guide portion 15 is disposed in one side portion of the barrier 7, and the second barrier slide guide portion 16 is disposed in the other side portion of the barrier 7.

The first barrier slide guide portion 15 is configured in the manner that the first barrier engagement body 25 provided in the housing 8 is engaged with the rail-shaped first barrier engagement body engagement portion 91 provided in the inner body 81. The second barrier slide guide portion 16 is configured in the manner that the second barrier engagement body 26 provided in the housing 8 is engaged with the rail-shaped second barrier engagement body engagement portion 92 provided in the inner body 81.

The first barrier engagement body engagement portion 91 is engaged by being overlapped with the first barrier engagement body 25 through the first long opening 93 formed in the one side portion of the inner body 81. Thereby, the first to fourth rollers 11 to 14 are lightly compressed pushed against the major face 3 of the housing 8. Similarly, the rail-shaped second barrier engagement body engagement portion 92 is engaged by being overlapped with the second barrier engagement body 26 through the second long opening 94 formed in the other side portion of the inner body 81. Thereby, the first to fourth rollers 11 to 14 are lightly compressed against the major face 3 of the housing 8. Consequently, along the one side portions of the respective first and second long openings 93 and 94, the barrier 7 is moved to either one of the first position for exposing the imaging lens and the second position for covering the imaging lens.

With reference to FIG. 14A, first stopper portions 18 are provided in the length direction of one-end sides of the rail-shaped first and second barrier engagement body engagement portions 91 and 92. When the barrier 7 has moved to the first position, the first stopper portions 18 abut against the first and second barrier engagement bodies 25 and 26, whereby the barrier 7 is prevented from being further moved. With reference to FIG. 14B, second stopper portions 19 are provided in the length direction of the first and second barrier engagement body engagement portions 91 and 92. When the barrier 7 has moved to the second position, the second stopper portions 19 abut against the first and second barrier engagement bodies 25 and 26, whereby the barrier 7 is prevented from being further moved. The first and second stopper portions 18 and 19 of the rail-shaped second barrier engagement body engagement portion 92, respectively, are formed of the substantially-U-formed clips 98 that prevent the second and fourth rollers 12 and 14 from falling off from the second and fourth roller containing portions 97.

(7) Configuration of Toggle Spring

When the barrier 7 stays in the first position, the toggle spring 17 urges the first and second barrier engagement bodies 25 and 26 against the first stopper portions 18, thereby to maintain the barrier 7 in a releasing state. On the other hand, when the barrier 7 stays in the second position, the toggle spring 17 urges the first and second barrier engagement bodies 25 and 26 against the second stopper portions 19, thereby to maintain the barrier 7 in a shielding state.

Figure 15:
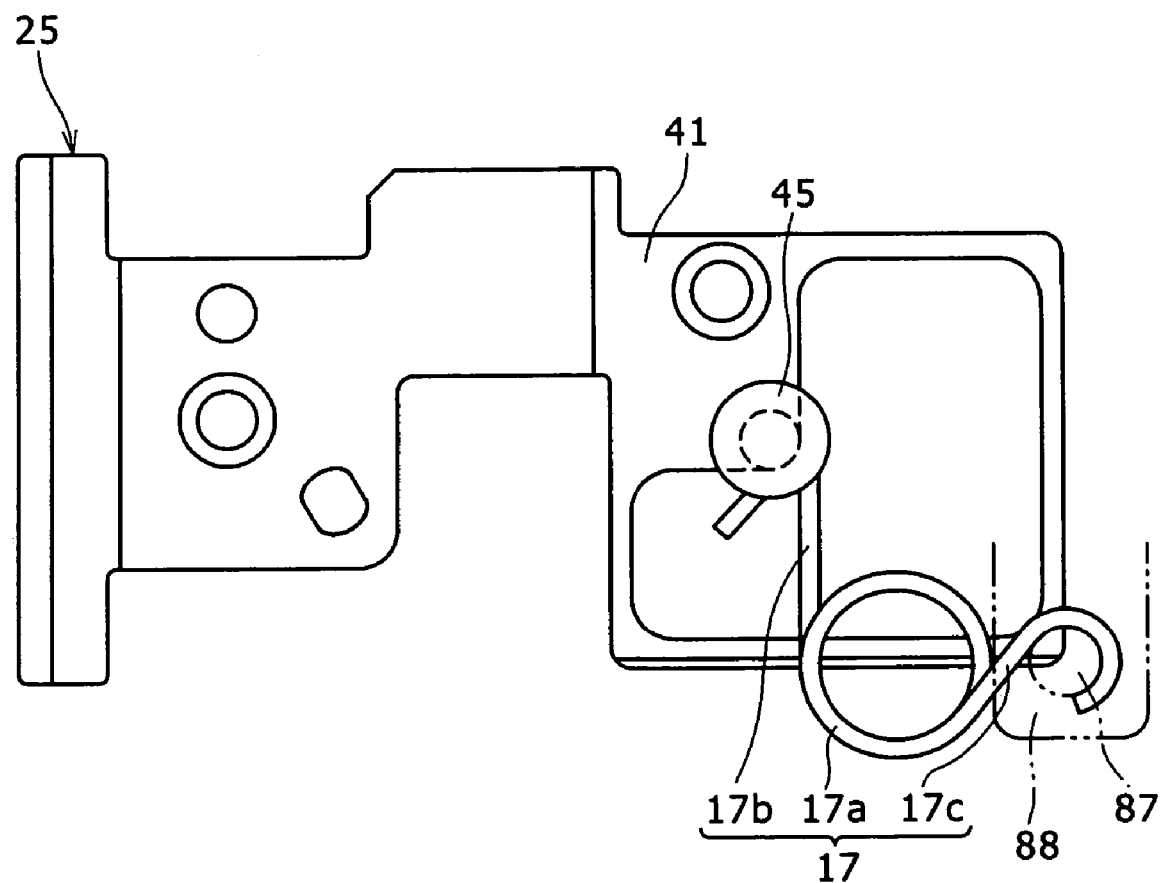
FIG. 15 is a view descriptive of the toggle spring.

With reference to FIG. 15, for the toggle spring 17, a so-called torsion coil spring formed is used that is formed of a coil portion 17a, a first arm portion 17b extending from one end of the coil portion 17a, and a second arm portion 17c extending from the other end of the coil portion 17a.

The first arm portion 17b of the toggle spring 17 is rotatably anchored to the first spring anchoring portion 45 provided on the mount base 41 of the first barrier engagement body 25. The second arm portion 17c of the toggle spring 17 is rotatably anchored to the second spring anchoring portion 87 provided to the louver piece 88 of the metal plate 83 (see FIG. 12) attached to the inner body 81.

As shown in FIG. 14A, when the barrier 7 stays in the first position, the toggle spring 17 urges the first stopper portions 18 against the first and second barrier engagement bodies 25 and 26, thereby maintaining the barrier 7 in a release mode. Then, as the barrier 7 is moved from the first position to the second position, the coil portion 17a of the toggle spring 17 rotates (reversely rotates). On the other hand, as shown in FIG. 14B, when the barrier 7 is moved to a predetermined position, a spring force operation direction of the toggle spring 17 is reversed, thereby urging the second stopper portions 19 against the first and second barrier engagement bodies 25 and 26, whereby to maintain the barrier 7 in an inhibited mode.

(8) Configuration of Cover of Memory Card Containing Section

The memory card cover 67 opens and closes the opening portion of the memory card containing section 66. With reference to a cross sectional view of FIG. 31, in the state of the cover kept closed, the memory card cover 67 has an end face lap portion 141 (cover body portion) overlapping with a second end face 65 (lower end face) connecting between the first major face 3 and the second major face 51, and a major face lap portion 142 overlapping with second major face 51 to be substantially flush therewith.

The memory card cover 67 is mounted with a cover rotation mechanism 143 to the housing 8. More specifically, the memory card cover 67 is mounted to the housing 8 to be rotatable between the first position (FIG. 31) for closing the opening portion 66a of the memory card containing section 66 and the second position (FIG. 33) for releasing the opening portion 66a.

The cover rotation mechanism 143 has a rotation support shaft 144 of the memory card cover 67; a long-groove shaped bearing 145 rotatably supporting the rotation support shaft 144 to the housing 8; and a rack 146 and a pinion 147. The rack 146 and the pinion 147 cause the rotation support shaft 144 to move along the long-groove shaped bearing 145 in accordance with the rotation of the rotation support shaft 144 in association with opening and closing of the memory card cover 67.

The rotation support shaft 144 is provided to the memory card cover 67, and the long-groove shaped bearing 145 is provided to the housing 8. The pinion 147 is provided to an external peripheral surface of the rotation support shaft 144, and the rack 146 is provided along a shaft movement direction of the long-groove shaped bearing 145.

The long-groove shaped bearing 145 is provided substantially parallel to an insertion direction A and an ejection direction B of a memory card 148 with respect to the memory card containing section 66. When the memory card cover 67 is closed, the rotation support shaft 144 moves inside the long-groove shaped bearing 145 along the insertion direction A of the memory card 148. When the memory card cover 67 is opened, the rotation support shaft 144 moves inside the long-groove shaped bearing 145 along the ejection direction B of the memory card 148.

Figure 33:
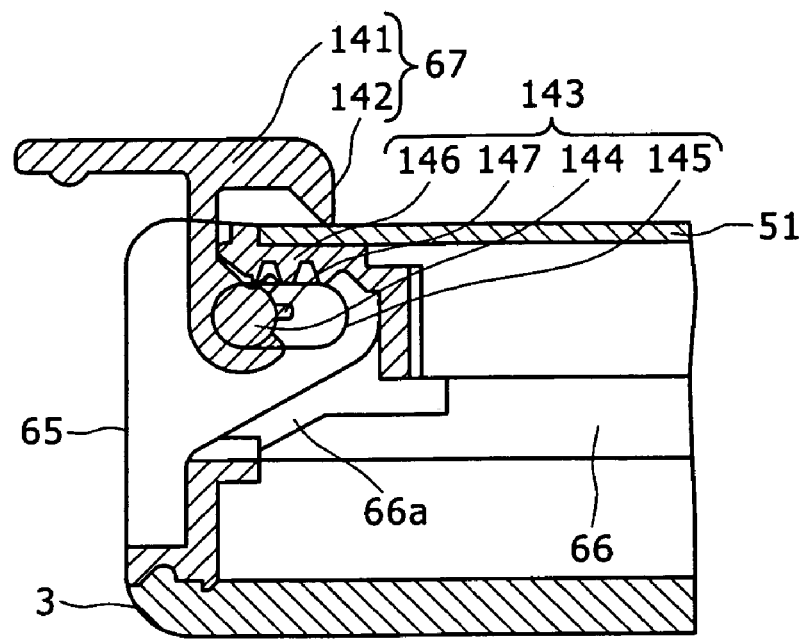
FIG. 33 is a cross sectional view of the cover rotation mechanism in a state where the memory card cover is opened.
Figure 34:
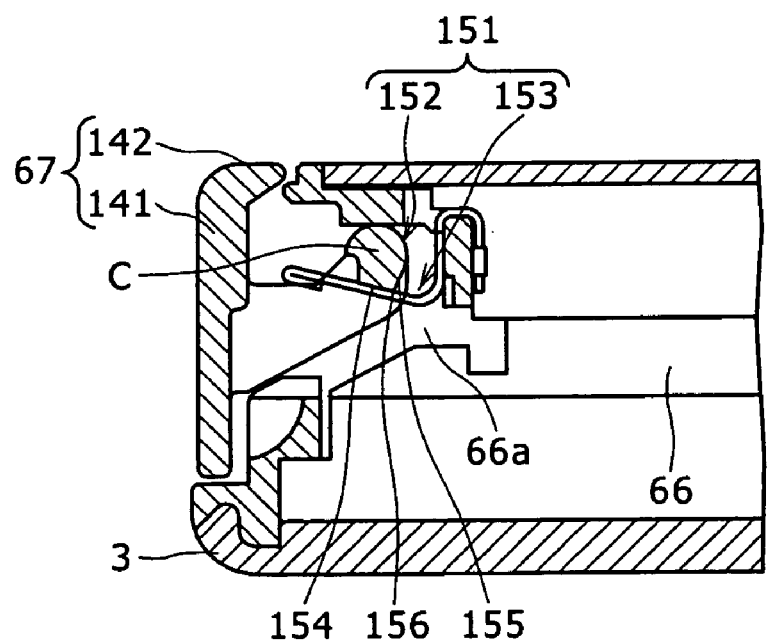
FIG. 34 is a cross sectional view of a crick mechanism in a state where the memory card cover is closed.
Figure 35:
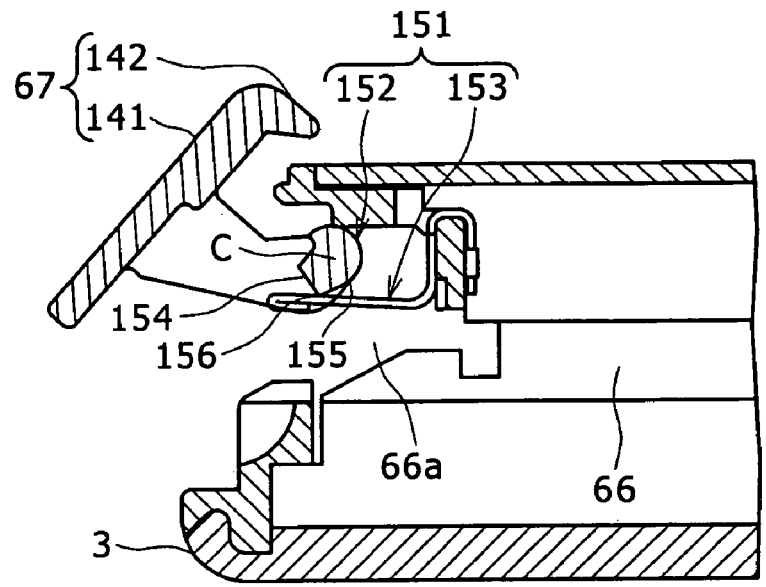
FIG. 35 is a cross sectional view of the crick mechanism in a state where the memory card cover is half-opened.
Figure 36:
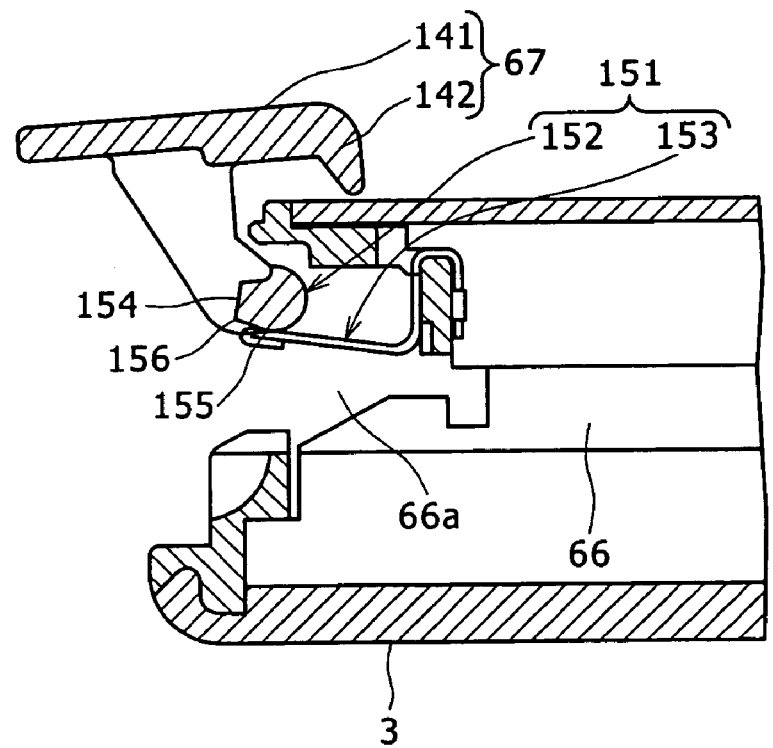
FIG. 36 is a cross sectional view of the crick mechanism in a state where the memory card cover is opened.

With reference to FIG. 34, the cover rotation mechanism 143 has a crick mechanism 151 in the manner that when the memory card cover 67 is closed, the rotation support shaft 144 is compressed against an end portion side of the long-groove shaped bearing 145 in the insertion direction A of the memory card 148 (see FIG. 31), and that when the memory card cover 67 is opened, the rotation support shaft 144 is compressed against an end portion side of the long-groove shaped bearing 145 in the ejection direction A of the memory card 148 (see FIG. 33).

The crick mechanism 151 includes a crick shaft 152 and a spring member 153 (leaf spring). The crick shaft 152 is provided to the memory card cover 67 and is rotated in conjunction with the rotation of the memory card cover 67. The spring member 153 is provided to the housing 8 and is in contact with an outer circumference surface of the crick shaft 152. A first spring contact face 154 and a second spring contact face 155 are successively provided in the rotation direction of the crick shaft 152 on the outer circumference surface of the crick shaft 152. The first spring contact face 154 is used to generate urging forces in the direction causing the spring member 153 to urge the rotation support shaft 144 against the end portion side of the long-groove shaped bearing 145 in the insertion direction A of the memory card 148. The second spring contact face 155 is used to generate urging forces in the direction causing the spring member 153 to urge the rotation support shaft 144 against the end portion side of the long-groove shaped bearing 145 in the ejection direction B of the memory card 148.

Figure 37:
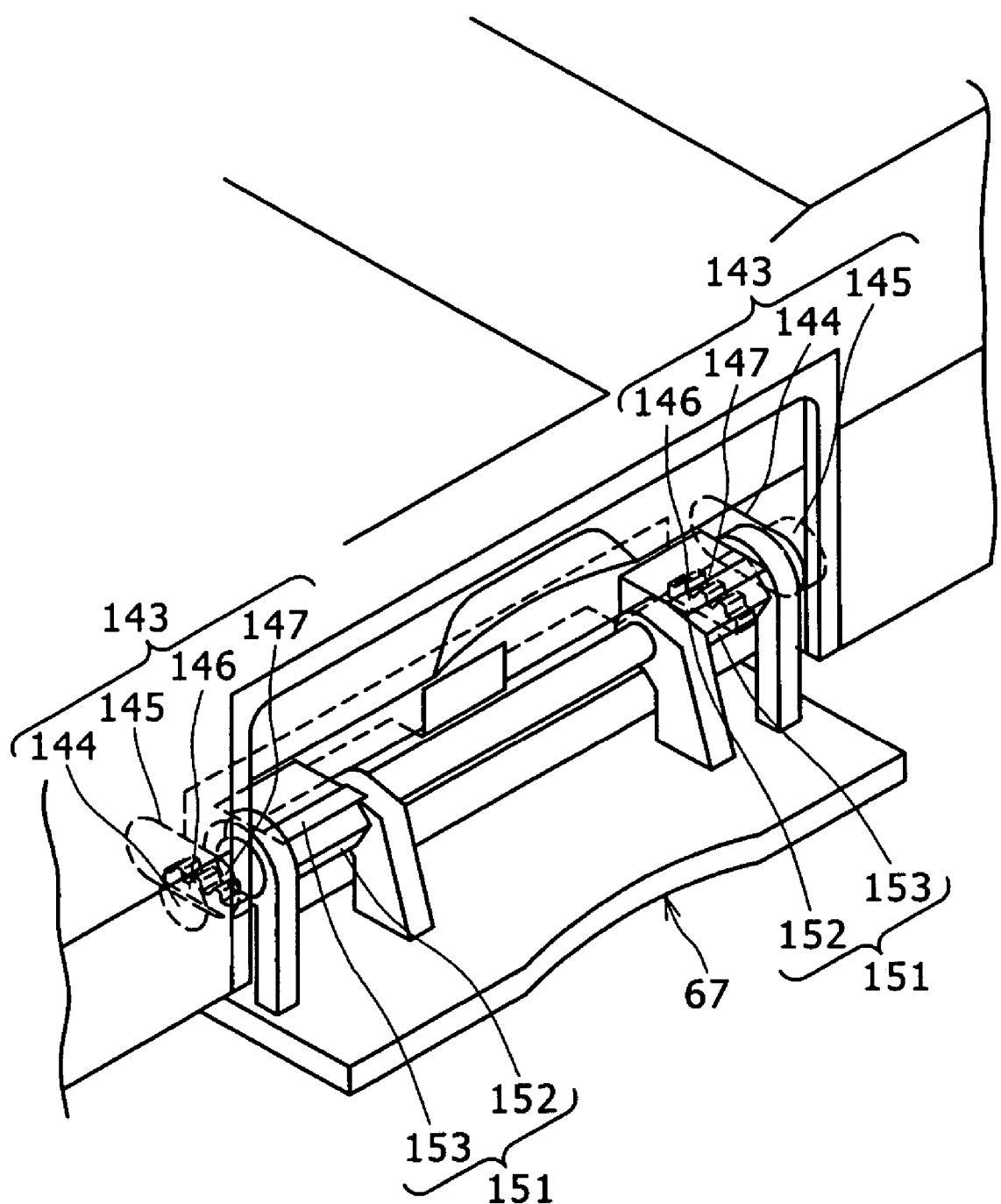
FIG. 37 is a perspective view of a state where the memory card cover is opened.

A boundary portion 156 between the first spring contact face 154 and the boundary portion 156 of the second spring contact face 155 is coincident with a so-called neutral position for not causing the spring member 153 to generate rotation forces of the crick shaft. The distance in the radial direction from a rotation shaft axis C is set longer than the distance in the radial direction from the rotation shaft axis C of the crick shaft 152 to each of the first and second spring contact faces 154 and 155. FIG. 37 is a perspective view of the state where the memory card cover 67 is open, which shows that a pair of cover rotation mechanisms 143 are disposed in two side portions of the memory card cover 67, and a pair of the crick mechanisms 151 are provided, respectively, in the pair of cover rotation mechanisms 143.

Figure 31:
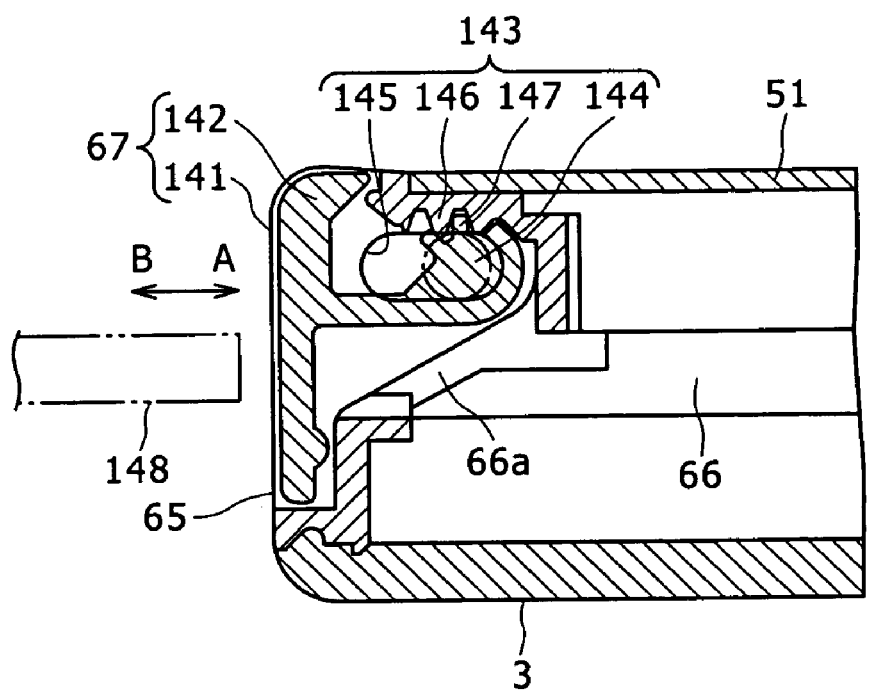
FIG. 31 is a cross sectional view of a cover rotation mechanism in a state where a memory card cover is closed.
Figure 32:
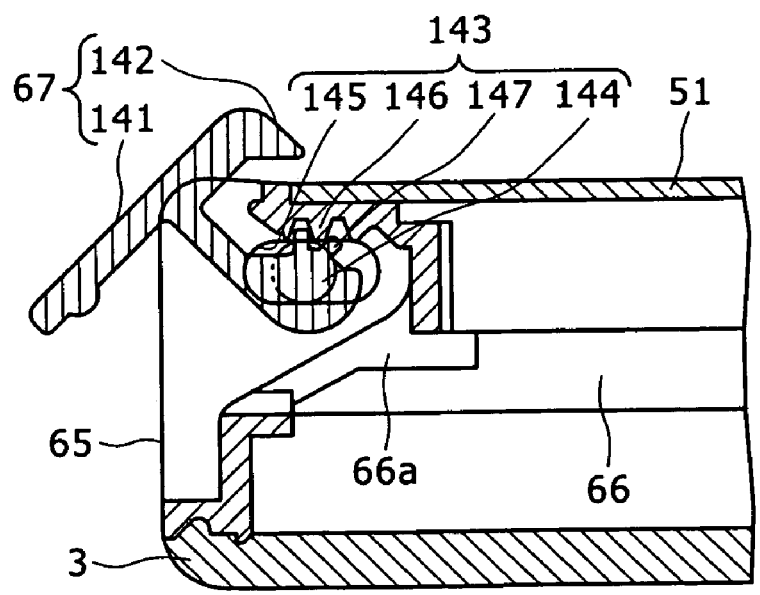
FIG. 32 is a cross sectional view of the cover rotation mechanism in a state where the memory card cover is half-opened.

The memory card cover 67 of the present embodiment is configured as described above. As shown in FIG. 31, in the state where the cover is closed, the outer face of the memory card cover 67 is substantially flush with the outer face of the housing 8. When opened, the memory card cover 67 progressively protrudes from the housing 8. Then, as shown in FIG. 33, in the full open mode, the memory card cover 67 protrudes by an amount corresponding to the height of the major face lap portion 142 from the second major face 51 of the housing 8, and the end face lap portion 141 (cover body portion) becomes parallel to the second major face 51.

(9) Configuration of Cover of Battery Compartment Portion

Figure 16:
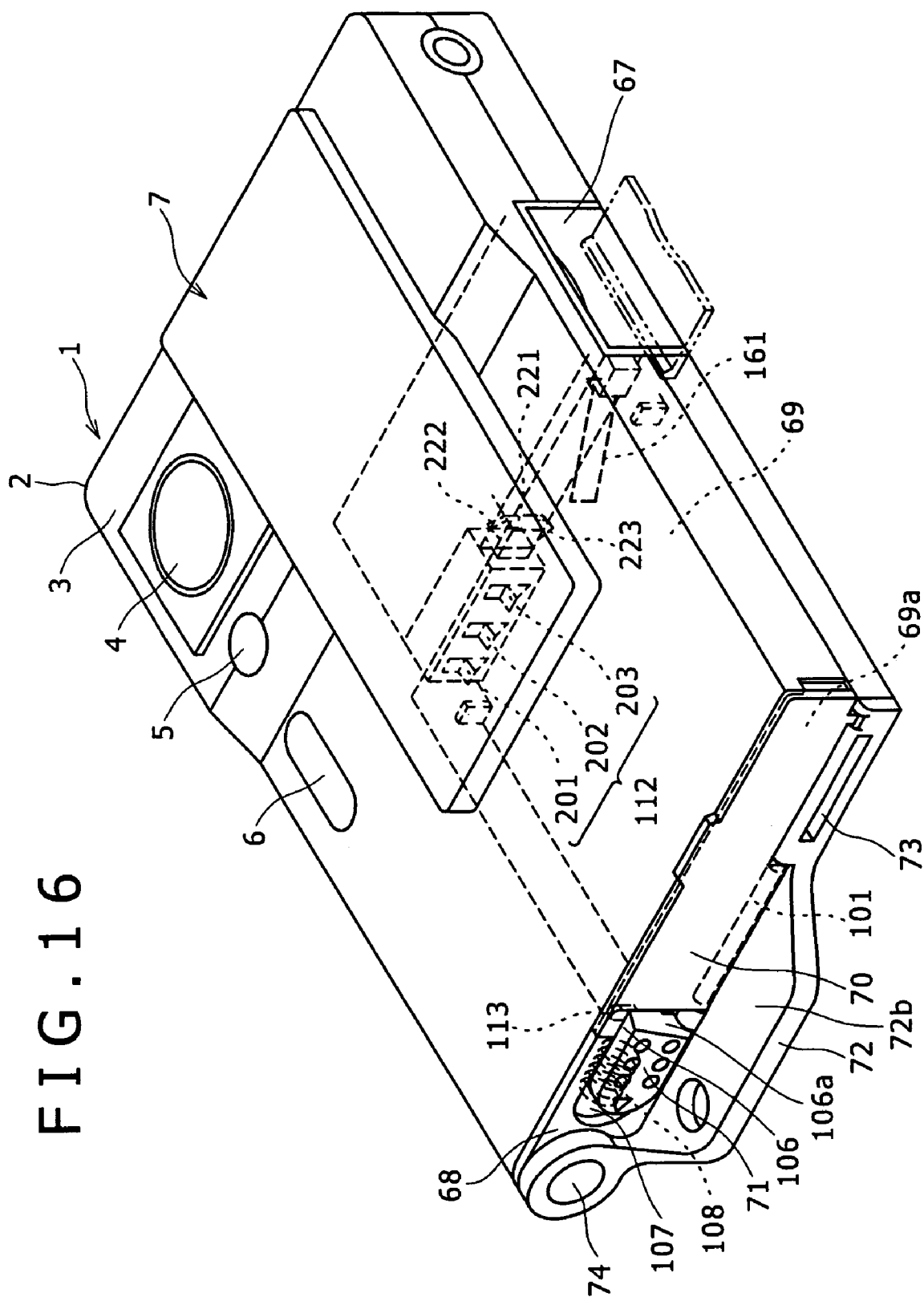
FIG. 16 is a perspective view of a state where a battery cover is closed.

With reference to FIG. 16, the second end face 68 connecting between the first major face 3 and the second major face 51 includes the battery cover 70 that opens and closes an opening portion 69a of the battery compartment portion 69; the battery release lever 71 that permits battery insertion into and removal from the opening portion 69a; the metallic strap fixture 72 that is overlapped with the battery cover 70 in the event of opening of the battery cover 70; and the multiconnector connection terminal 73. The battery release lever 71 is disposed in the state where it is arranged on the outside of the one-end portion of the battery cover 70 in the length direction.

Figure 17:
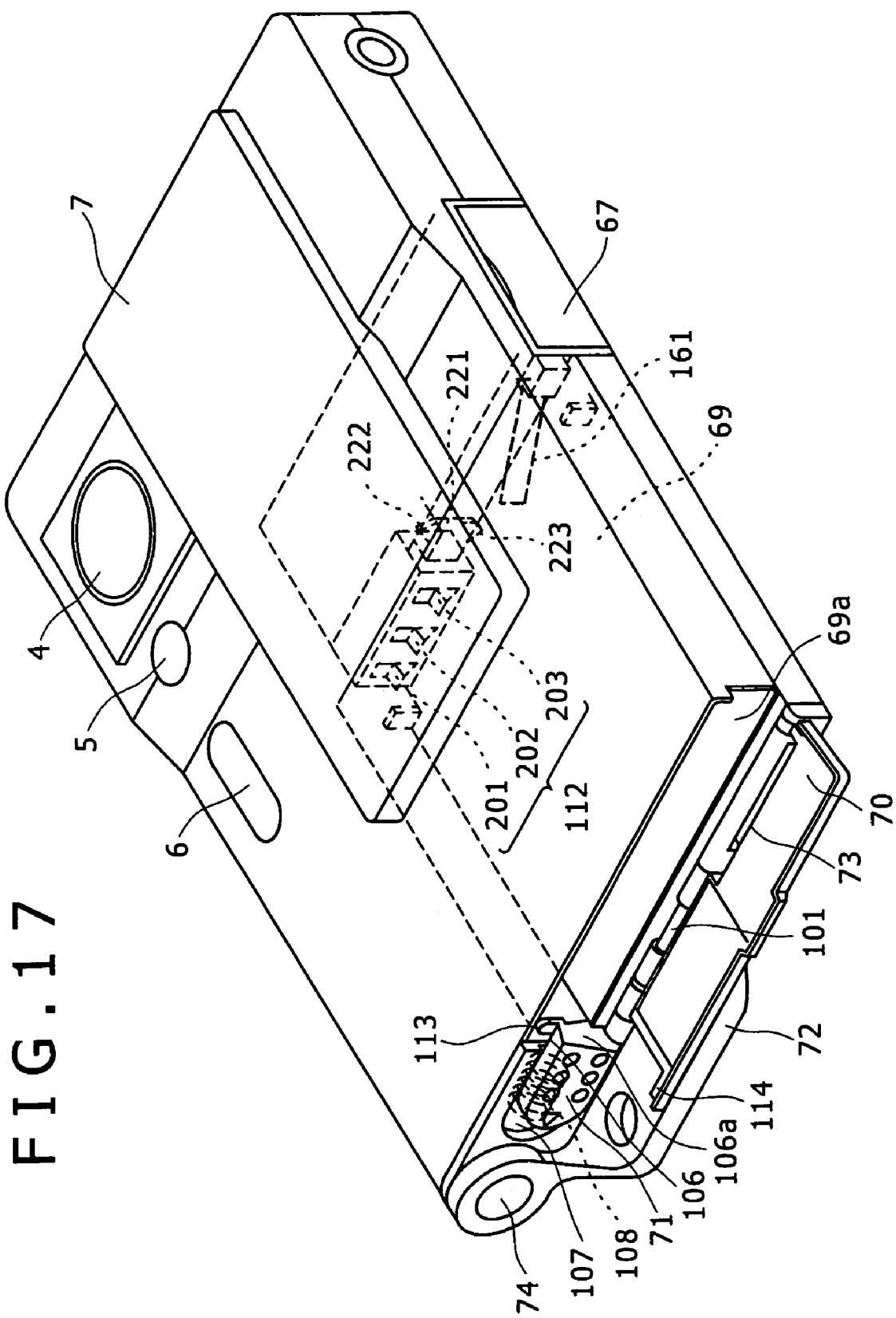
FIG. 17 is a perspective view of a state where the battery cover is opened.

The battery cover 70 is rotatably mounted with a shaft 101 to the housing 8. As shown in FIG. 16, when the battery cover 70 is rotated clockwise about the shaft 101, the battery cover 70 overlaps with the second end face 68 of the housing 8, thereby closing the opening portion 69a. As shown in FIG. 17, when rotated about 100 degrees in the counterclockwise direction from the state shown in FIG. 16, then, as shown in FIG. 17, the battery cover 70 becomes in an open state. Then, the battery cover 70 overlaps with the metallic strap fixture 72, whereby the battery cover 70 is regulated for further rotation, and is protected by the metallic strap fixture 72.

Figure 18:
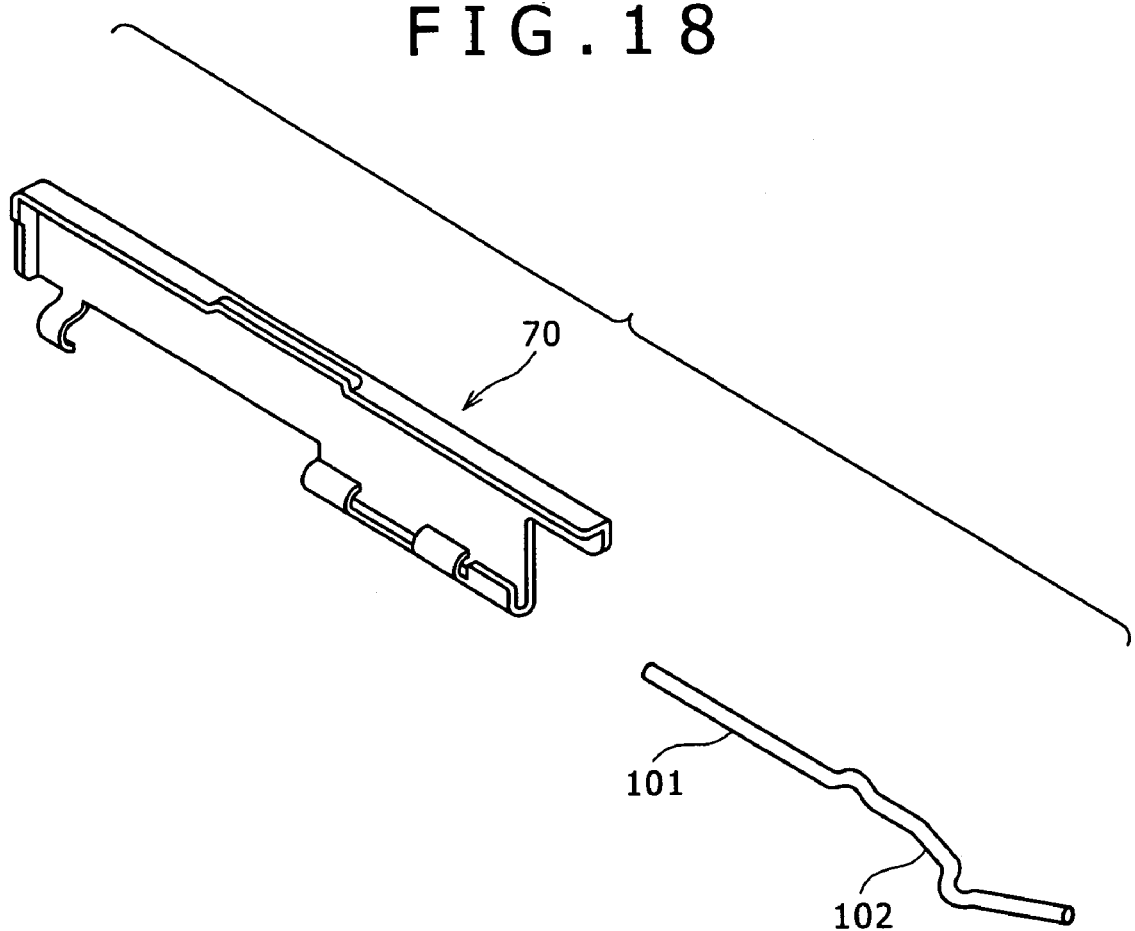
FIG. 18 is a perspective view of the battery cover and a shaft thereof.
Figure 19:
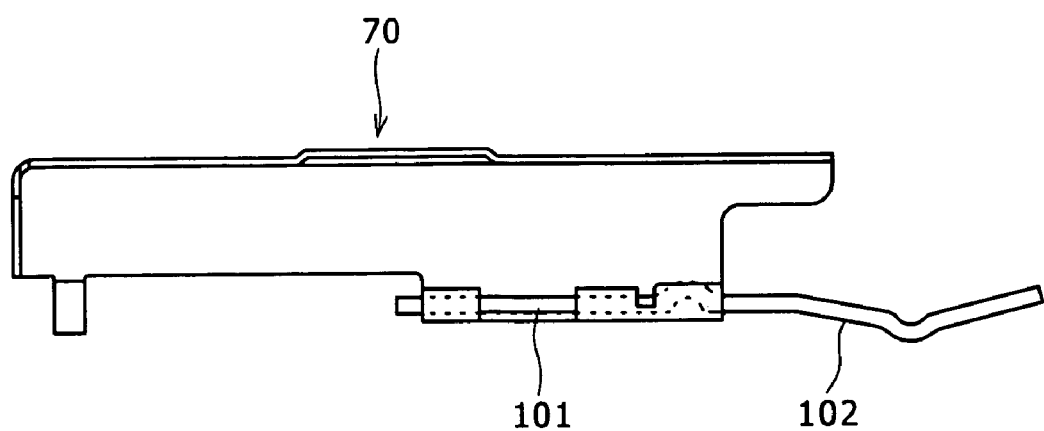
FIG. 19 is a front view of a state where the shaft is mounted to the battery cover.

With reference to FIG. 18, the shaft 101 is formed of an elastic metal rod, and has a spring portion 102 on its one-end side. In the inhibited mode of the battery cover 70, the spring portion 102 urges the battery cover 70 against the side of the second end face 68 of the housing 8. On the other hand, in the release mode of the battery cover 70, the spring portion 102 urges the battery cover 70 against the metallic strap fixture 72. The spring portion 102 is integrally formed by bending the one-end side of the shaft 101, and is in contact with the spring abutment face 103 provided on the side of the housing 8, as shown in FIGS. 20A and 20B.

Figure 20A:
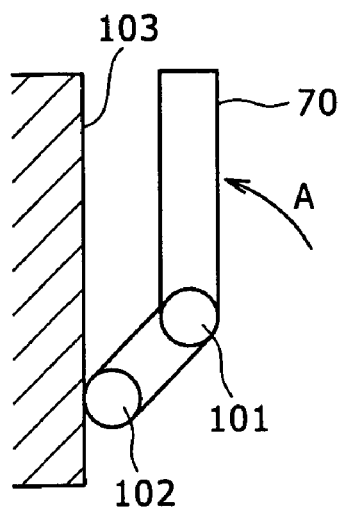
FIG. 20A is a view descriptive of operation of a spring portion provided to a one-end portion of the shaft.
Figure 20B:
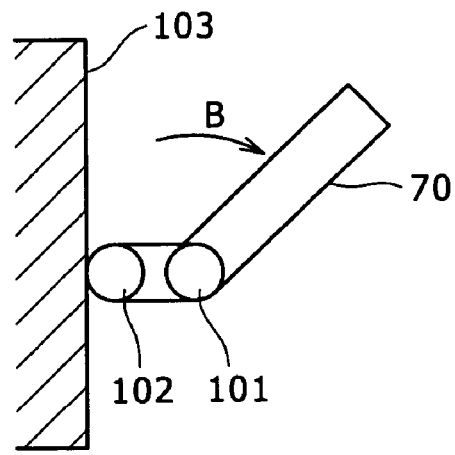
FIG. 20B is a view descriptive of operation of the spring portion provided to the one-end portion of the shaft.
Figure 20C:
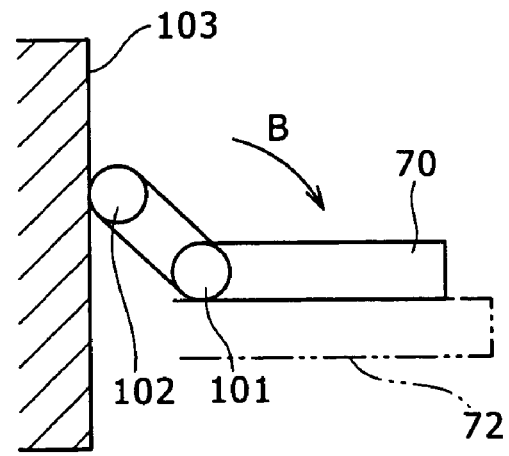
FIG. 20C is a view descriptive of operation of the spring portion provided to the one-end portion of the shaft.

When closing the battery cover 70, as shown in FIG. 20A, the spring portion 102 contacts a spring abutment face 103 provided on the side of the housing 8 and thereby imparts rotation forces in an arrow A direction (counterclockwise direction), thereby to urge the battery cover 70 against the second end face 68 side of the housing 8. When rotating the battery cover 70 along the open direction (arrow B direction) from the state shown in FIG. 20A, the spring portion 102 is progressively deformed as being compressed by the spring abutment face 103. Thereby, as shown in FIG. 20B, when the battery cover 70 is opened by a predetermined angle, such as 45 degrees, the spring portion 102 is deformed largest and is located at the neutral position where rotation forces are not imparted to the shaft 101 and the battery cover 70. When the battery cover 70 is rotated further along the open direction (arrow B direction) from the state shown in FIG. 20B, then the spring portion 102 generates spring forces in the direction (arrow B direction) causing the battery cover 70 to open. Thereby, as shown in FIG. 20C, the battery cover 70 is urged against the metallic strap fixture 72, whereby to be maintained in the open state of the opening portion 69a of the housing 8.

(10) Configuration of Battery Release Lever

With reference to FIGS. 16 and 17, the battery release lever 71 is mounted in a lever guide portion 107. The lever guide portion 107 is provided on the second end face 68 to enable a battery engagement portion 106 provided in the one-end portion to be slidable between a position that causes closing of a part of the opening portion 69a of the battery compartment portion 69 and a position that causes opening of the opening portion 69a. The battery release lever 71 is urged by a spring member 108 disposed on the bottom face side to the position that causes closing of the part of the opening portion 69a of the battery compartment portion 69. The upper surface of the battery engagement portion 106 is used as a sloped battery extrusion face 106a.

Figure 21:
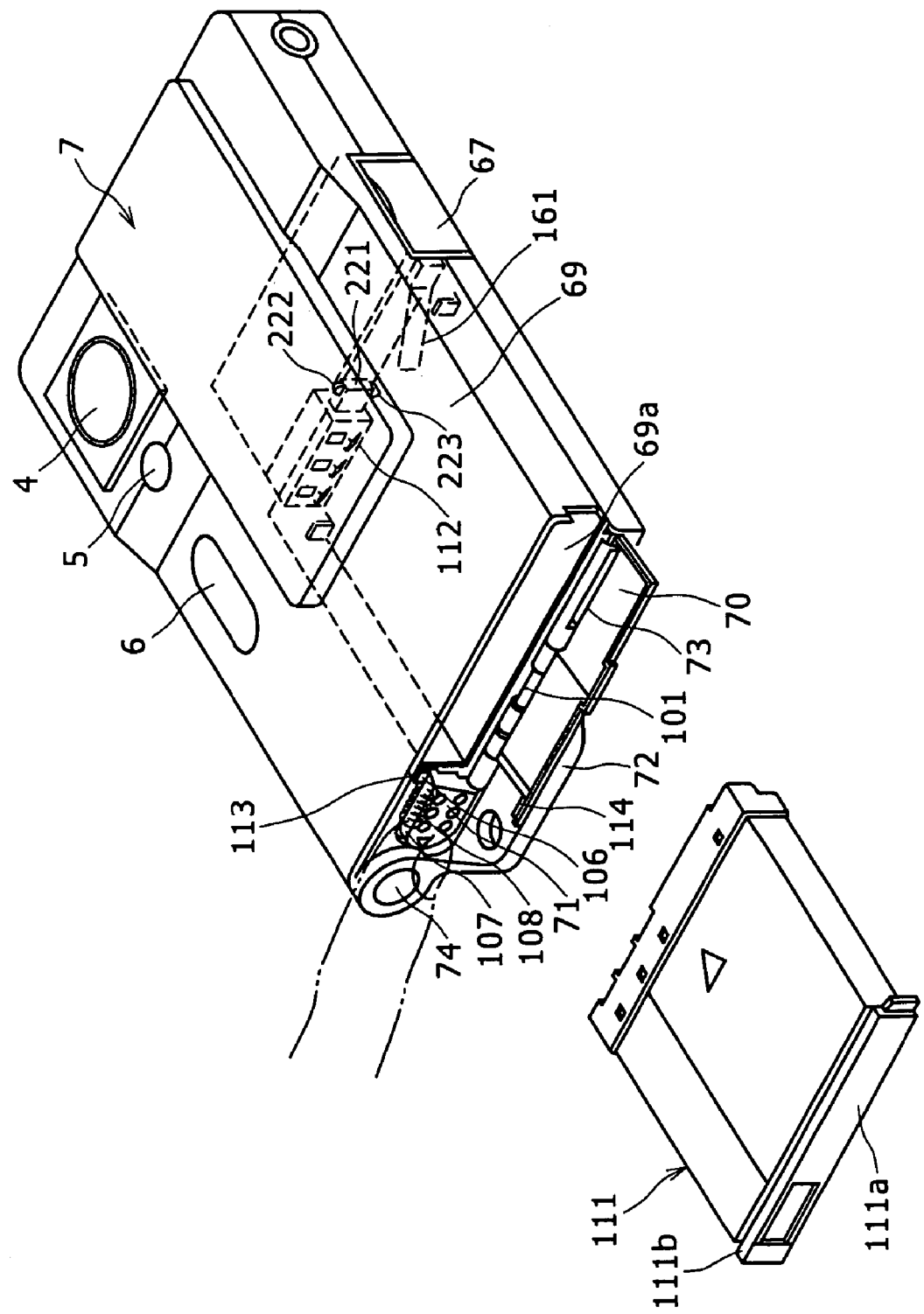
FIG. 21 is a perspective view of a state before the battery cover is opened and a battery is stored.

Referring now to FIG. 21, the battery 111 is inserted into the battery compartment portion 69 in the state of the battery release lever 71 returned in opposition to spring forces of the spring member 108 to a position not cause interference on insertion of the battery 111, i.e., the position that causes opening of the opening portion 69a. Upon insertion of the battery 111 into the battery compartment portion 69, the battery ejecting spring 161 is compressed and deflexed to restore forces over the front end surface of the battery 111. Thereby, the terminals provided on the front end surface of the battery 111 are brought into contact with battery terminals provided on the depth-wise end side of the battery compartment portion 69.

Figure 22:
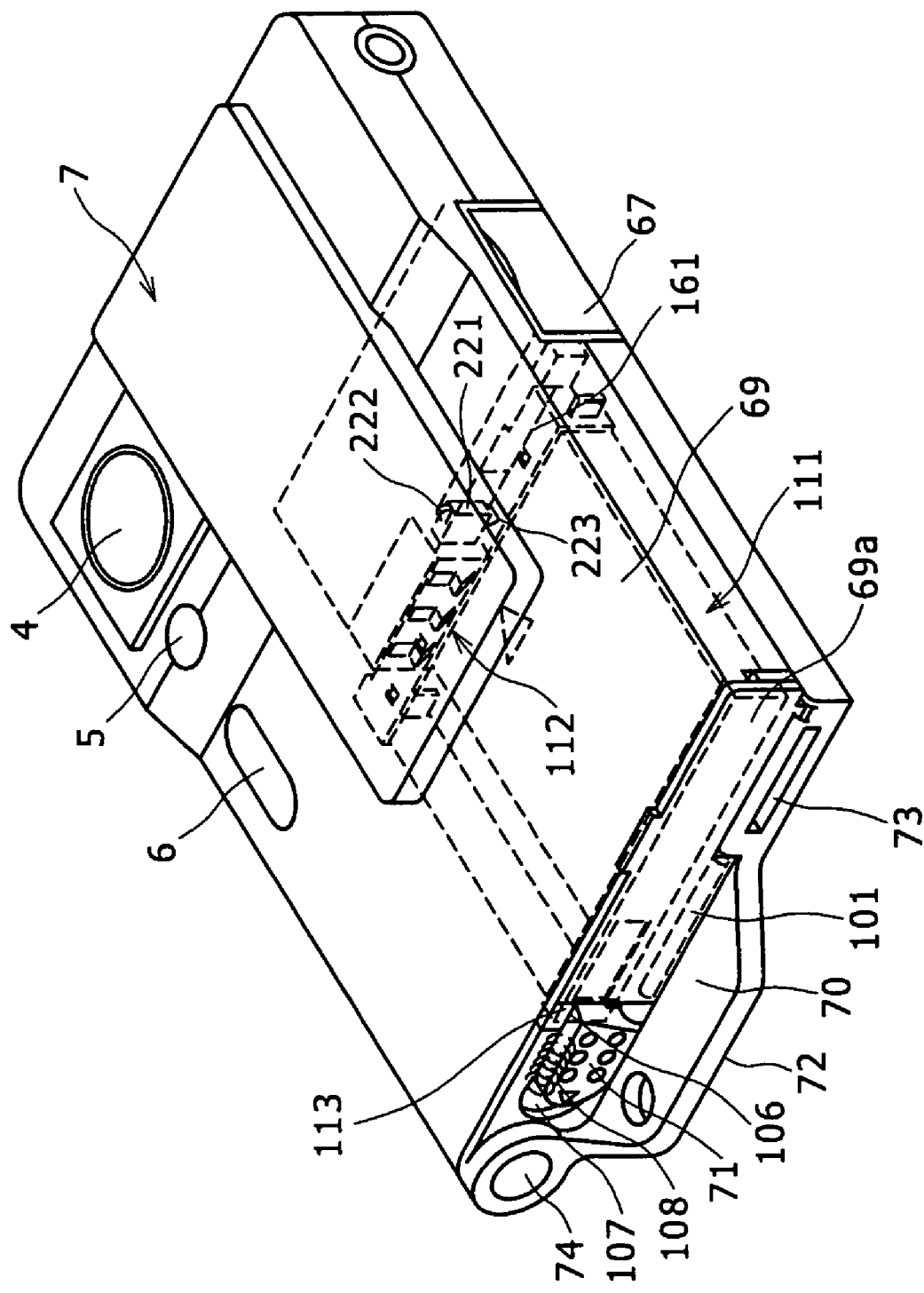
FIG. 22 is a perspective view of a state where the battery is stored and the battery cover is closed.

When a push-back holding mode of the battery release lever 71 is cancelled after the battery 111 has been stored in the battery compartment portion 69, the battery release lever 71 is automatically returned by spring forces of the spring member 108 to the position causing closing the part of the opening portion 69a of the battery compartment portion 69. Thereby, the battery 111 is prevented from falling off from the battery compartment portion 69. Then, as shown in FIG. 22, the battery cover 70 is closed, and then the insertion of the battery 111 is completed.

Suppose that, in the state of the battery cover 70 having been closed, the battery release lever 71 can be pushed back, and, for example, the battery release lever 71 is pushed back by error. In such a case, a case can undesirably occur in which the battery 111 is pushed out of the battery compartment portion 69 by being urged by spring forces of the device side terminal portion 112 provided in the depth-wise end side of the battery compartment portion 69 and spring forces of the battery ejecting spring. When the amount of the pushed out state is small, a case can occur in which, because of the presence of the battery cover 70, it cannot be clearly recognized that the battery 111 is not completely stored in the battery compartment portion 69.

Figure 23:
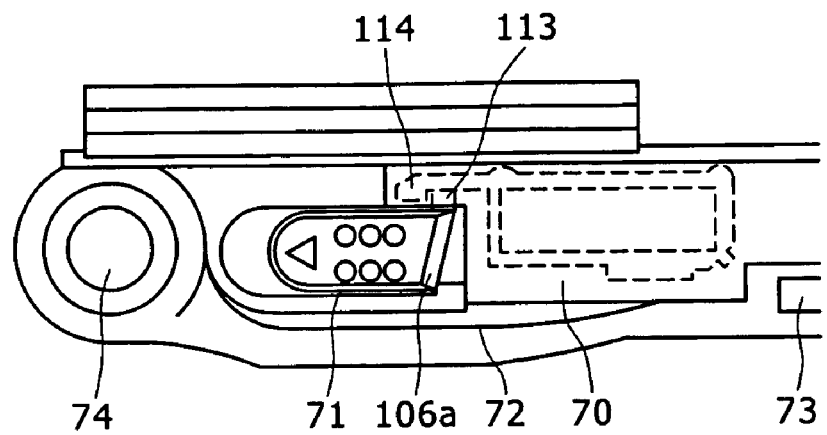
FIG. 23 is a view descriptive of a state where a battery release lever cannot be pushed back.
Figure 24:
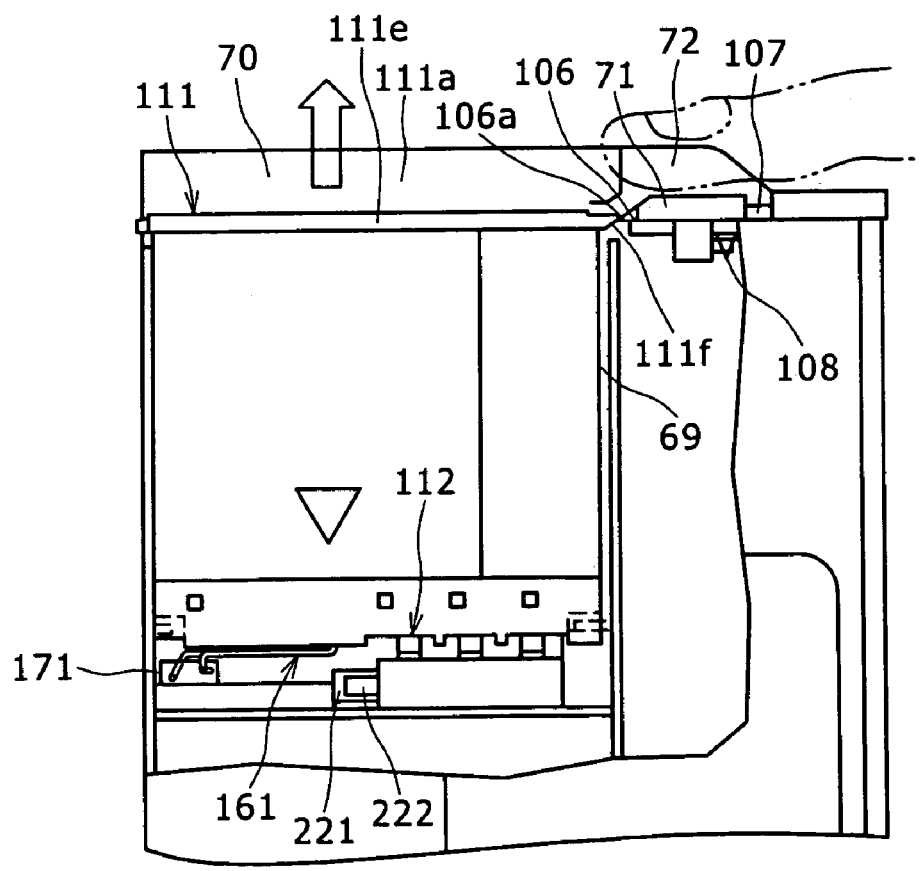
FIG. 24 is a view descriptive of a state where the battery is pushed out.

As such, as shown in FIG. 21, a cover engagement portion 113 is provided to the battery release lever 71, and a release lever engagement portion 114 is provided to the battery cover 70. In this configuration, as shown in FIG. 23, when the battery cover 70 is closed, the release lever engagement portion 114 is positioned on a side portion of the cover engagement portion 113. On the other hand, when attempt is made to move the battery release lever 71 along the push-back direction, the cover engagement portion 113 engages the release lever engagement portion 114. Thereby, the battery release lever 71 is prevented from being pushed back in the state of the battery cover 70 being closed.

The battery 111 is removed from the battery compartment portion 69 by pushing back the battery release lever 71 in opposition to urging forces of the spring member 108 after the battery cover 70 is opened. With reference to FIG. 14, when a holding mode of the battery 111 is cancelled by pushing back the battery release lever 71, the battery 111 is pushed out of the battery compartment portion 69 by spring forces of the terminals of the device side terminal portion 112.

Figure 25:
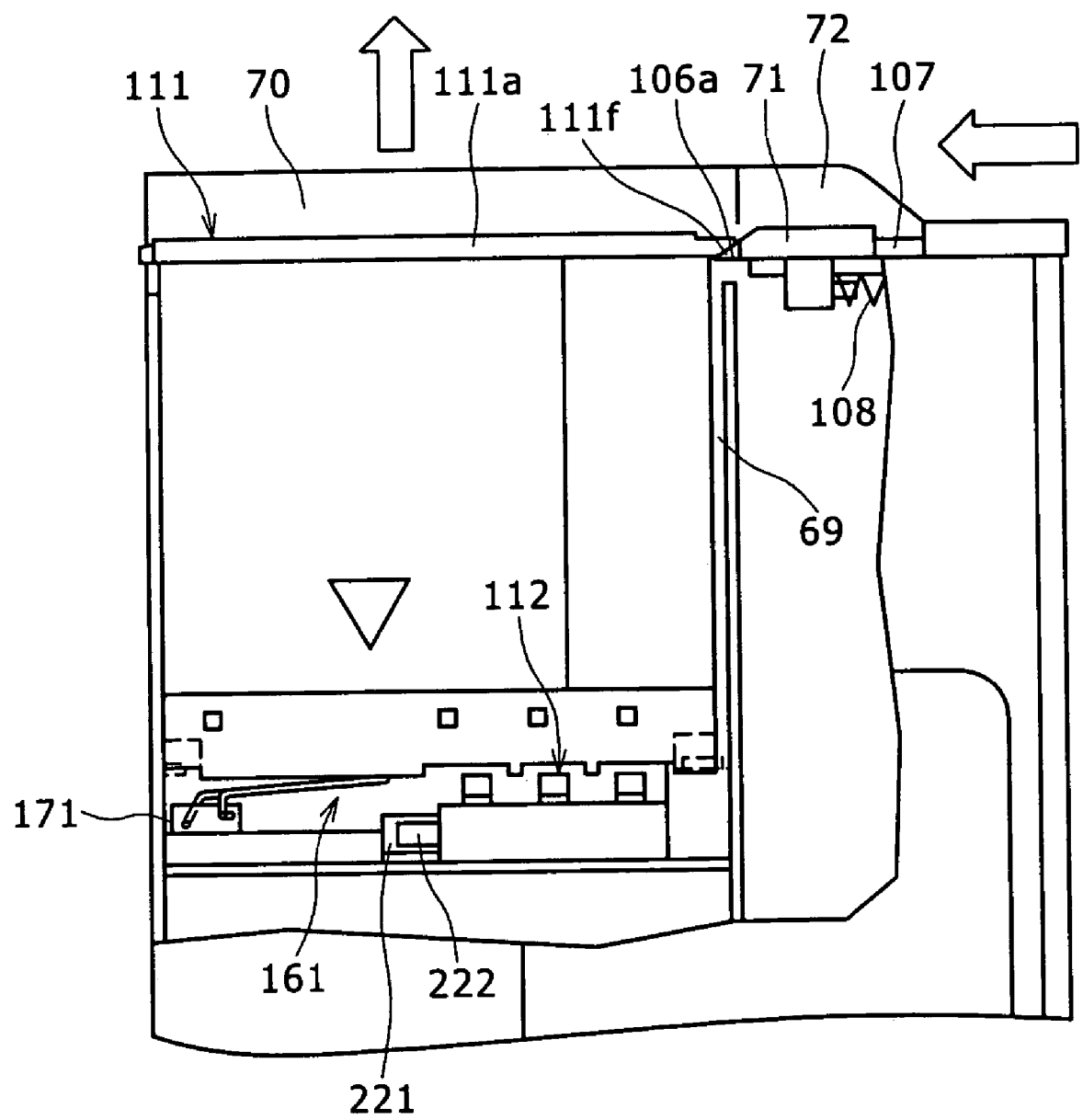
FIG. 25 is a view descriptive of a state where the battery is pushed out by using the battery release lever.
Figure 26:
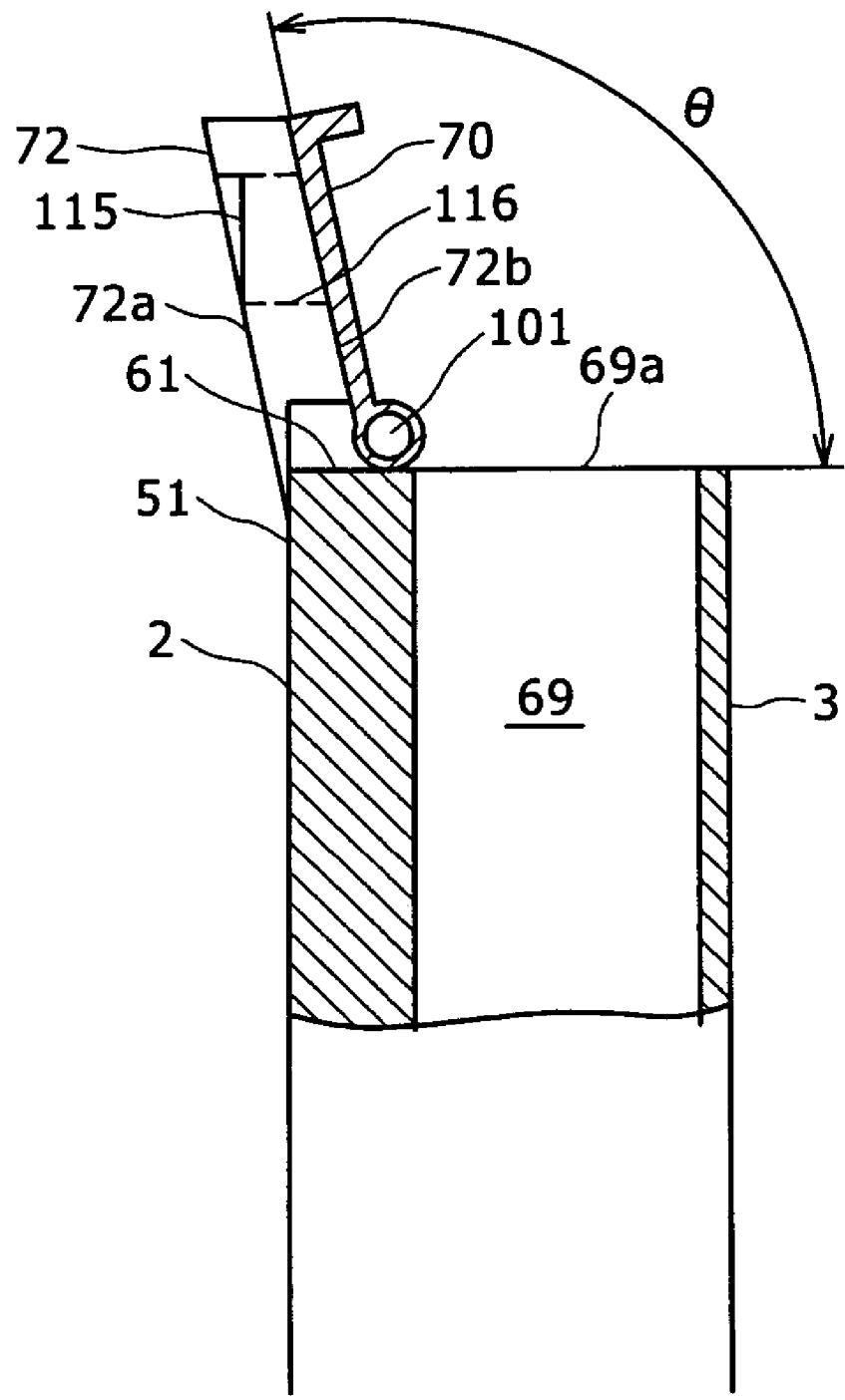
FIG. 26 is a side view of a metallic strap fixture.

After the battery 111 has been pushed out by spring forces of the terminals of the device side terminal portion 112, the battery release lever 71 is moved to the rear portion of the battery 111, as shown in FIG. 25. In this case, a sloped face 111f provided on a plate 111e of the battery 111 is pushed by the sloped battery extrusion face 106a formed on the upper surface of the battery engagement portion 106 of the battery release lever 71, thereby to further push the battery 111 out of the battery compartment portion 69.

(11) Configuration of Strap Fixture

The metallic strap fixture 72 is used to attach a strap, such as a wrist strap for wearing on a wrist or a neck strap for wearing on the neck, for preventing falling off. When used with, for example, a thumb being touched thereon, the metallic strap fixture 72 functions also to ease holding of the housing 8 in the event of imaging operation.

As shown in FIGS. 2A, 2B, and 16, the metallic strap fixture 72 is integrally formed such as to elevate along a peripheral edge on the second major face 51 side of the second end face 68 of the housing 8. A first face 72a on the second major face 51 side and a second face 72b on the opposite side thereto are used as receiving faces of the battery cover 70. The second face 72b is formed with a slope angle θ at least greater than 90 degrees with respect to either one of the end face 61 of the housing 8 and the opening portion 69a of the battery compartment portion 69. A groove-shaped engagement portion 115 is provided on the first face 72a. In the case that a multiconnector 121 described below is connected to the multiconnector connection terminal 73, the groove-shaped engagement portion 115 is engaged by an engagement portion 127 of the multiconnector 121 to prevent the multiconnector 121 from being detached from the multiconnector connection terminal 73. An opening 116 for attaching the strap is provided in the metallic strap fixture 72.

Figure 27:
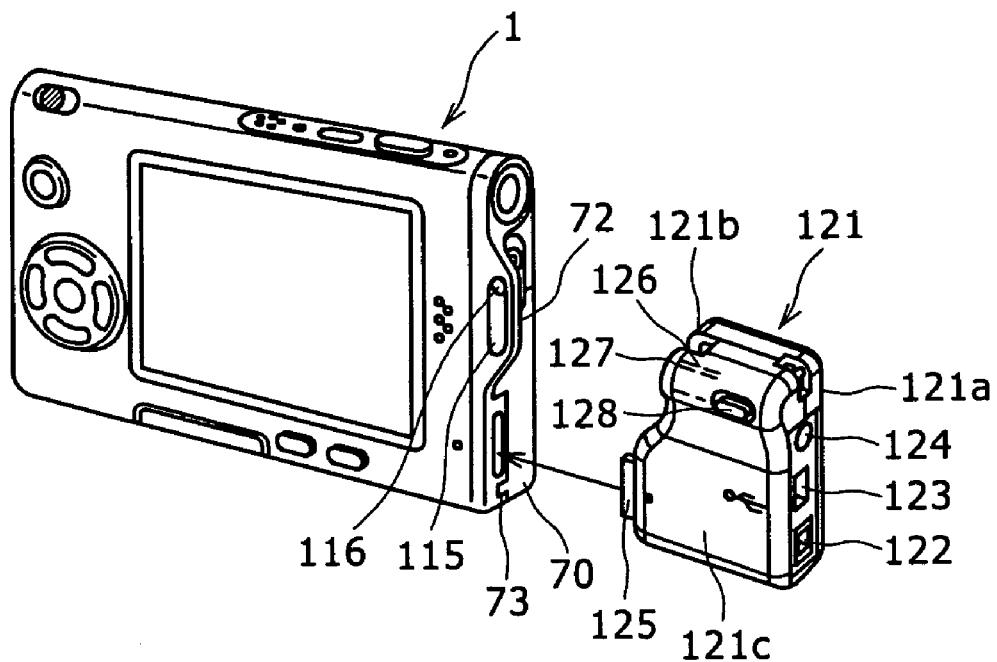
FIG. 27 is a perspective view of a state before a multiconnector is mounted to the camera.

FIG. 27 shows the multiconnector 121 to be connected to the multiconnector connection terminal 73. The multiconnector 121 includes a DC input terminal 122, a USB terminal 123, and an A/V output terminal 124 on a first side face 121a; a terminal 125 for insertion into the multiconnector connection terminal 73; and a metal strap fixture insertion recess portion 126 for receiving the inserted the metallic strap 72 on a second side face 121b; and the engagement portion 127 to be engagement by the groove-shaped engagement portion 115 of the metallic strap fixture 72 along an inner surface of a metal strap fixture insertion recess portion 126; and an engagement cancellation button 128 on a third side face 121c for performing engagement cancellation operation (or, disengagement operation) to disengage the engagement portion 127 from the groove-shaped engagement portion 115.

Figure 28:
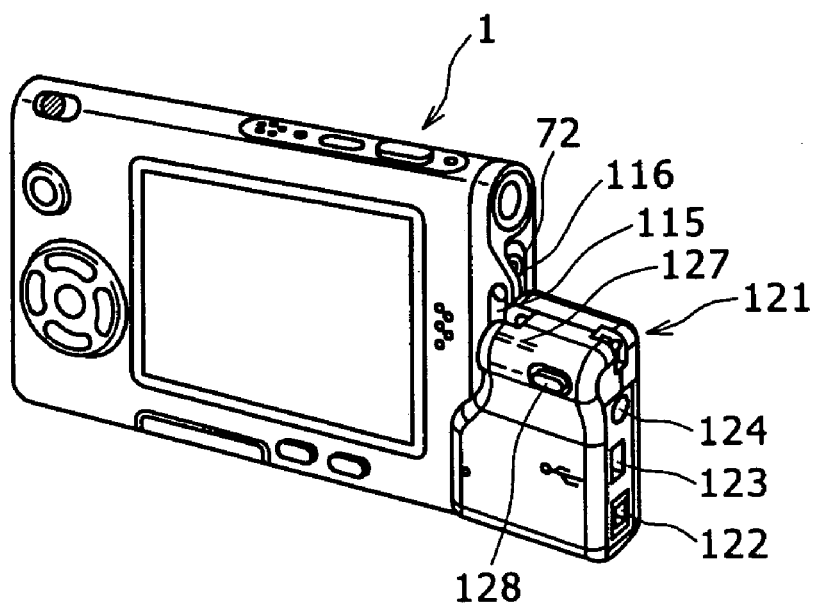
FIG. 28 is a perspective view of the camera to which the multiconnector is mounted.

When, as shown in FIG. 27, the terminal 125 is inserted into the multiconnector connection terminal 73 from a substantially midlateral side of the camera 1, then, as shown in FIG. 28, the metallic strap fixture 72 is automatically inserted into the metal strap fixture insertion recess portion 126. Concurrently, the engagement portion 127 engages the engagement portion 115, thereby to lock the multiconnector 121 to the side of the digital camera 1.

Figure 29:
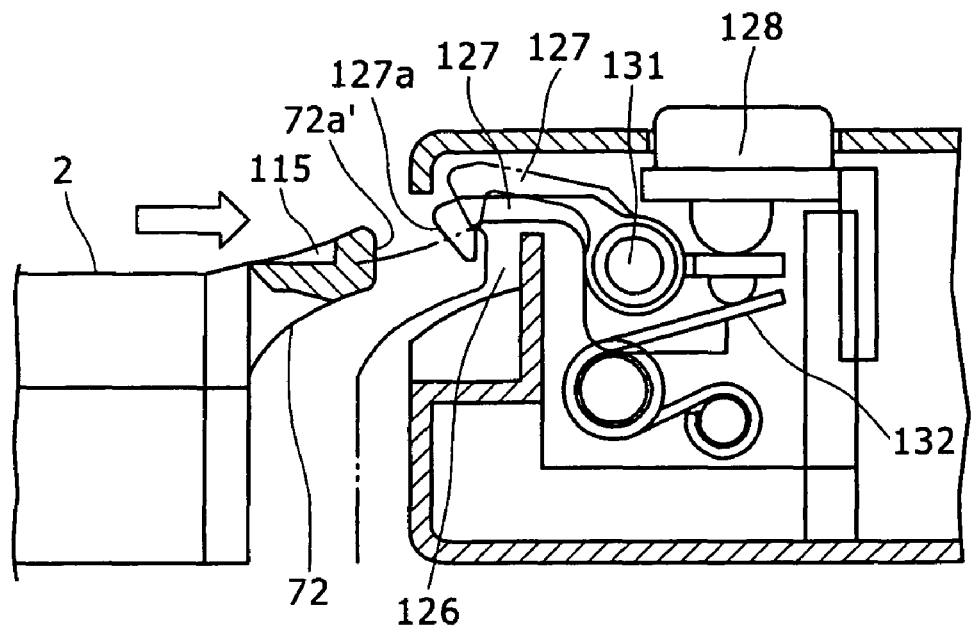
FIG. 29 is a view of a state where the multiconnector is locked by the metallic strap fixture.

FIG. 29 is a cross sectional view of essential portions of the multiconnector 121. The engagement portion 127 shaped as a nail is rotatable about a shaft 131, and is protruded by a spring 132 into the metal strap fixture insertion recess portion 126. When the metallic strap 72 is inserted into the metal strap fixture insertion recess portion 126, a sloped surface 127a of a front end of the engagement portion 127 is compressed by a front end surface 72a of the metallic strap 72. Thereby, the engagement portion 127 is rotated along an escape direction in opposition to urging forces of the spring 132. When the metallic strap 72 is completely inserted into the metal strap fixture insertion recess portion 126, compression by a front end surface 72a' of the metallic strap 72 on the sloped surface 127a of the front end of the engagement portion 127 is cancelled. Then, the engagement portion 127 is automatically rotated by urging forces of the spring 132, thereby to engage the groove-shaped engagement portion 115.

Figure 30:
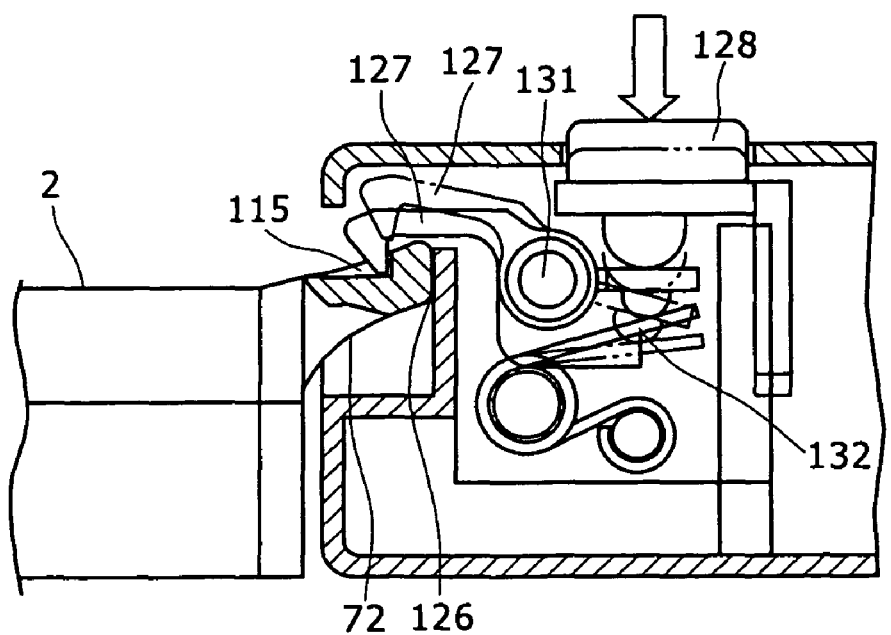
FIG. 30 is a cross sectional view of a state where locking is released.

When detaching the multiconnector 121 from the camera 1, the engagement cancellation button 128 is depressed. Thereby, as shown in FIG. 30, the engagement portion 127 is rotated along the escape direction in apposition to the spring 132, and engagement with the groove-shaped engagement portion 115 is cancelled, whereby the multiconnector 121 enters a detachable state.

As described above, the configuration is formed in which the multiconnector 121 is engaged with the metallic strap 72. Accordingly, compared with the configuration in which a corresponding multiconnector is not engaged with a corresponding metallic strap fixture, it is advantageous in that, even when, for example, a cord of the multiconnector 121 is pulled to thereby cause exertion of a great force, the force is not directly exerted on the connector connection portion, so that the connector, the terminals, and the like can be protected.

In comparison with three-dimensional views of, for example, FIGS. 1A to 2B, FIGS. 12 to 26, for example, are plan or three-dimensional views of individual portions of the imaging apparatus. Among these views, although slight differences are present in, for example, the radii of curvatures and slope angles of, for example, curved faces, sloped surfaces, cylindrical surfaces, the differences are attributed to variations in figure rendition, and like reference characters designate like portions. Further, among the three-dimensional views of, for example, FIGS. 1A to 2B, and the three-dimensional views of the imaging apparatus shown in, for example, FIGS. 16 and 17, although slight differences are present in, for example, the radii of curvatures and slope angles of, for example, curved faces, sloped surfaces, cylindrical surfaces, the differences are attributed to variations in figure rendition. In addition, in some cross sectional views, hatching indication is omitted.

The embodiments have thus been described with reference to the case of the digital still camera exemplified as the electronic device. However, the electronic device to which the present invention is adapted is not limited to an imaging apparatus such as the digital camera, but the present invention is widely adaptable to any one of battery-using small electronic devices, such as mobile phones and portable game machines.

While the present invention has been described as above, it is to be understood that other changes and variations may be made without departing from the spirit or scope of the appended claims.

The invention claimed is:

1. An electronic device, comprising:
   a flat housing having an interior;
   a battery compartment locatable in the interior of the housing; and
   a device side terminal portion in the interior of the housing that is contactable with a side terminal portion of a battery stored in the battery compartment, the device side terminal portion including:
      a plurality of terminals each one including a battery contact portion at one end thereof that is contactable with a corresponding terminal of the side terminal portion of the battery and a printed circuit board contact portion at an opposite end thereof that is electrically connectable to the circuitry of a printed circuit board, and
      a terminal holder having a body portion and an overlap portion, the body portion having a first side surface and a second side surface on opposing sides of the body portion, the overlap portion protruding outward from the second side surface of the body portion such that terminal holder is substantially "L" shaped,
      the body portion holding the plurality of terminals such that (i) the battery contact portion of each one of the plurality of terminals protrudes outward from the first side surface of the body portion, and (ii) the printed circuit board contact portion of each one of the plurality of terminals protrudes upward from a location near an end of the overlap portion remote from the second side surface of the body portion so that when the overlap portion supports an end portion of the printed circuit board in an overlapping relationship, each one of the printed circuit board contact portions extends through respective opening in the end portion of the printed circuit board to be electrically connectable to the circuitry of the printed circuit board.

2. An electronic device according to claim 1, wherein the printed circuit board connection portions that protrude from the overlap portion of the terminal holder and through the end portion of the printed circuit board are soldered to the printed circuit board.

3. An electronic device according to claim 1, wherein:
   the terminals of the device side terminal portion, respectively, include base portions having substantially "L" shapes, the contacts being provided on one end of the base portions, and printed circuit board connection portions being provided on the other end of the base portions; and
   the base portions are attached to the terminal holder in a state where the base portions overlap with the holder body portion of the terminal holder and front ends of the respective contacts protrude from the openings of the holder body portion on the side of the one side surface of the holder body portion.

4. An electronic device according to claim 3, wherein the printed circuit board connection portions are led out onto the printed circuit board through lead-out openings provided on the printed circuit board overlapping with the overlap portion of the terminal holder.

5. An electronic device according to claim 1, wherein the terminals of the device side terminal portion are integrally formed by bending a single metal plate.

6. An electronic device according to claim 1, wherein the terminal holder includes a ground terminal connected to at least one of the plurality of terminals.

7. An electronic device according to claim 1, wherein the terminal holder includes a plurality of ground terminals connected to at least one of the plurality of terminals, the ground terminals being disposed on an upper surface and a lower surface of the terminal holder.

8. An electronic device according to claim 1, wherein the terminal holder includes a plurality of ground terminals connected to at least one of the plurality of terminals, the ground terminals being disposed on one of an upper surface or a lower surface of the terminal holder.

9. An electronic device according to claim 1, wherein the terminal holder includes a ground terminal connected to a negative terminal of the plurality of terminals.

10. An electronic device according to claim 9, wherein the ground terminal is integral with the negative terminal.

11. A camera, comprising:
    a flat housing having an interior;
    a battery compartment locatable in the interior of the housing; and
    a device side terminal portion in the interior of the housing that is contactable with a side terminal portion of a battery stored in the battery compartment, the device side terminal portion including:
       a plurality of terminals each one including a battery contact portion at one end thereof that is contactable with a corresponding terminal of the side terminal portion of the battery and a printed circuit board contact portion at an opposite end thereof that is electrically connectable to the circuitry of a printed circuit board, and
       a terminal holder having a body portion and an overlap portion, the body portion having a first side surface and a second side surface on opposing sides of the body portion, the overlap portion protruding outward from the second side surface of the body portion such that terminal holder is substantially "L" shaped,
       the body portion holding the plurality of terminals such that (i) the battery contact portion of each one of the plurality of terminals protrudes outward from the first side surface of the body portion, and (ii) the printed circuit board contact portion of each one of the plurality of terminals protrudes upward from a location near an end of the overlap portion remote from the second side surface of the body portion so that when the overlap portion supports an end portion of the printed circuit board in an overlapping relationship, each one of the printed circuit board contact portions extends through a respective opening in the end portion of the printed circuit board to be electrically connectable to the circuitry of the printed circuit board.

12. A camera according to claim 11, wherein the printed circuit board connection portions that protrude from the overlap portion of the terminal holder and through the end portion of the printed circuit board are soldered to the printed circuit board.

13. A camera according to claim 11, wherein the terminals of the device side terminal portion are integrally formed by bending a single metal plate.

14. A camera according to claim 11, wherein the terminal holder includes a plurality of ground terminals connected to at least one of the plurality of terminals, the ground terminals being disposed on an upper surface and a lower surface of the terminal holder.

15. A camera according to claim 11, wherein the terminal holder includes a plurality of ground terminals connected to at least one of the plurality of terminals, the ground terminals being disposed on one of an upper surface or a lower surface of the terminal holder.

16. A camera according to claim 11, wherein the terminal holder includes a ground terminal connected to a negative terminal of the plurality of terminals.

17. A portable game machine, comprising:

a flat housing having an interior;

a battery compartment locatable in the interior of the housing; and a device side terminal portion in the interior of the housing that is contactable with a side terminal portion of a battery stored in the battery compartment, the device side terminal portion including:

a plurality of terminals each one including a battery contact portion at one end thereof that is contactable with a corresponding terminal of the side terminal portion of the battery and a printed circuit board contact portion at an opposite end thereof that is electrically connectable to the circuitry of a printed circuit board, and a terminal holder having a body portion and an overlap portion, the body portion having a first side surface and a second side surface on opposing sides of the body portion, the overlap portion protruding outward from the second side surface of the body portion such that terminal holder is substantially "L" shaped, the body portion holding the plurality of terminals such that (i) the battery contact portion of each one of the plurality of terminals protrudes outward from the first side surface of the body portion, and (ii) the printed circuit board contact portion of each one of the plurality of terminals protrudes upward from a location near an end of the overlap portion remote from the second side surface of the body portion so that when the overlap portion supports an end portion of the printed circuit board in an overlapping relationship, each one of the printed circuit board contact portions extends through a respective opening in the end portion of the printed circuit board to be electrically connectable to the circuitry of the printed circuit board.

18. A portable game machine according to claim 17, wherein the printed circuit board connection portions that protrude from the overlap portion of the terminal holder and through the end portion of the printed circuit board are soldered to the printed circuit board.

19. A portable game machine according to claim 17, wherein the terminals of the device side terminal portion are integrally formed by bending a single metal plate.

20. A portable game machine according to claim 17, wherein the terminal holder includes a plurality of ground terminals connected to at least one of the plurality of terminals, the ground terminals being disposed on an upper surface and a lower surface of the terminal holder.

21. A portable game machine according to claim 17, wherein the terminal holder includes a plurality of ground terminals connected to at least one of the plurality of terminals, the ground terminals being disposed on one of an upper surface or a lower surface of the terminal holder.

22. A portable game machine according to claim 17, wherein the terminal holder includes a ground terminal connected to a negative terminal of the plurality of terminals.

* * * * *